US010724505B2

(12) United States Patent
Thiercelin et al.

(10) Patent No.: US 10,724,505 B2
(45) Date of Patent: Jul. 28, 2020

(54) AERIAL INSPECTION IN A MOVABLE OBJECT ENVIRONMENT

(71) Applicant: DJI Technology, Inc., Burbank, CA (US)

(72) Inventors: Arnaud Thiercelin, Sunnyvale, CA (US); Robert Schlub, Palo Alto, CA (US); Akshat Patel, Palo Alto, CA (US)

(73) Assignee: DJI Technology, Inc., Burbank, CA (US)

( * ) Notice: Subject to any disclaimer, the term of this patent is extended or adjusted under 35 U.S.C. 154(b) by 301 days.

(21) Appl. No.: 15/649,201

(22) Filed: Jul. 13, 2017

(65) Prior Publication Data

US 2018/0149138 A1   May 31, 2018

Related U.S. Application Data

(60) Provisional application No. 62/428,453, filed on Nov. 30, 2016.

(51) Int. Cl.

| G05D 1/00 | (2006.01) |
|---|---|
| G05D 3/00 | (2006.01) |
| G06F 7/00 | (2006.01) |
| G06F 17/00 | (2019.01) |
| F03D 80/50 | (2016.01) |
| B64C 39/02 | (2006.01) |
| B64D 47/08 | (2006.01) |
| F03D 17/00 | (2016.01) |

(52) U.S. Cl.
CPC .............. *F03D 80/50* (2016.05); *B64C 39/02* (2013.01); *B64C 39/024* (2013.01); *B64D 47/08* (2013.01); *F03D 17/00* (2016.05); *B64C 2201/123* (2013.01); *B64C 2201/127* (2013.01); *B64C 2201/141* (2013.01); *B64C 2201/146* (2013.01); *Y02E 10/72* (2013.01)

(58) Field of Classification Search
CPC ......... F03D 80/50; F03D 17/00; B64C 39/02; B64C 39/024; B64D 47/08; G05D 1/0011
USPC .......................................................... 701/2
See application file for complete search history.

(56) References Cited

U.S. PATENT DOCUMENTS

| 9,162,763 | B1 * | 10/2015 | Tofte | ..................... B64C 39/024 |
| 2017/0192418 | A1 * | 7/2017 | Bethke | ................. G05D 1/0094 |
| 2018/0121576 | A1 * | 5/2018 | Mosher | ............... G06F 17/5009 |

\* cited by examiner

*Primary Examiner* — Mahmoud S Ismail
(74) *Attorney, Agent, or Firm* — Nicholson De Vos Webster & Elliot LLP

(57) ABSTRACT

Techniques are disclosed for inspection management in a movable object environment. An inspection application can receive data from an inspection application and use this data to generate one or more inspection missions. When a user selects an inspection mission in the inspection application, the inspection application can instruct a movable object to perform the selected inspection mission. The movable object can follow one or more dynamically generated paths around a target object and capture a plurality of images. The images can be viewed in a viewing application to perform an inspection of the target object.

31 Claims, 19 Drawing Sheets

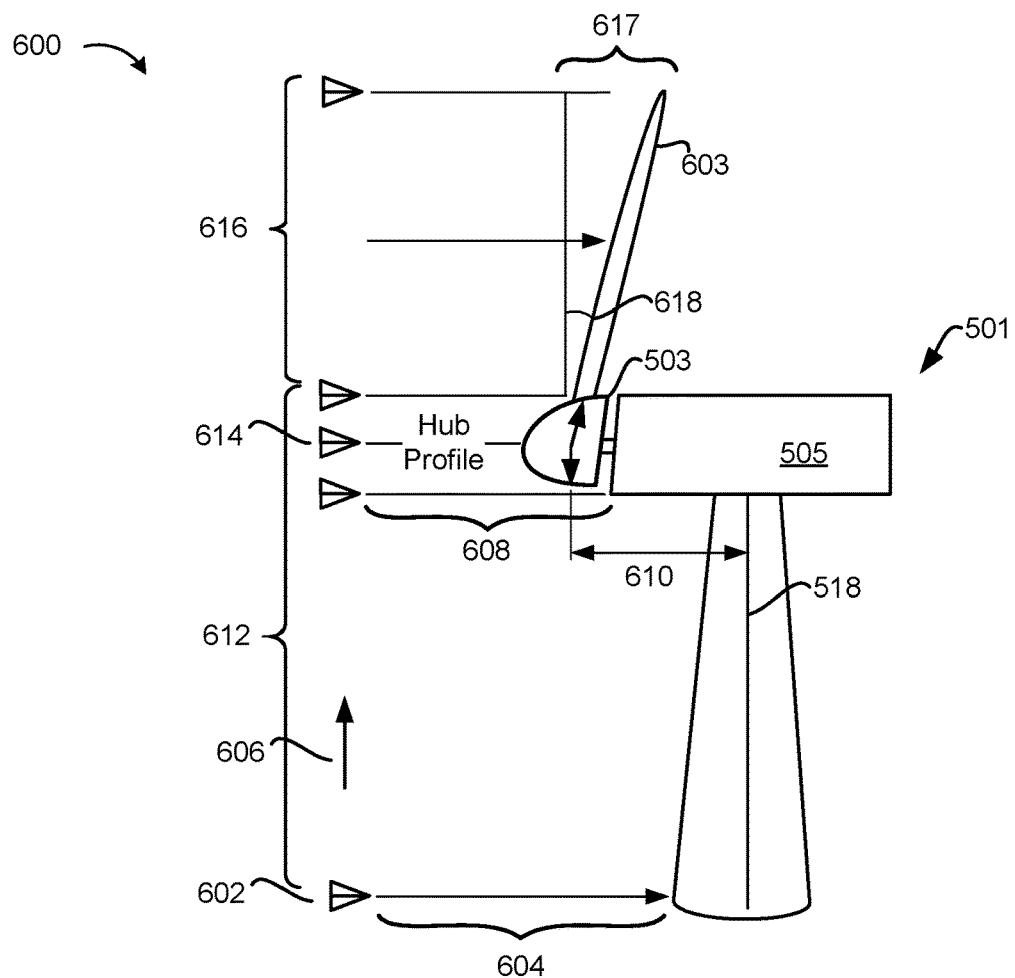
FIG. 6A
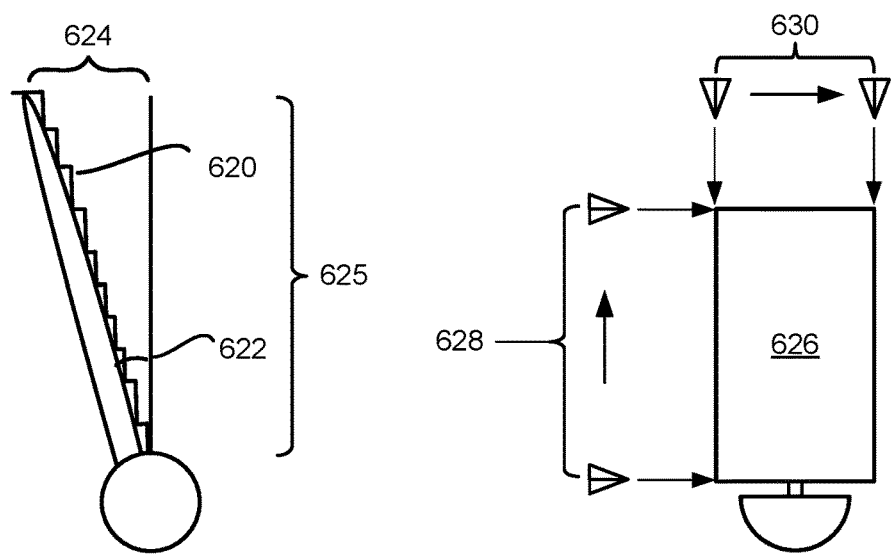
FIG. 6B
FIG. 6C

700

| Preflight Checklist |  |
|---|---|
| Aircraft Connection 702 | ✓ |
| Aircraft Location 704 | ✓ |
| Remote Control 706 | ✓ |
| Calibration 708 | ✓ |
| Battery Levels 710 | ✓ |
| Safe Distance from Target 712 | ✓ |
| Clear Take Off Area 714 | ✓ |
| START | |

AERIAL INSPECTION IN A MOVABLE OBJECT ENVIRONMENT

This application claims priority from U.S. Provisional Patent Application No. 62/428,453 filed on Nov. 30, 2016, the content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques performing aerial inspection in a movable object environment and more particularly, but not exclusively, to managing movable objects to perform aerial inspection of target objects.

BACKGROUND

Machinery and other mechanical devices often require visual inspection as part of their regular maintenance to help identify potential problems before they result in damage or failure. Large machinery, and machinery installations over large areas, may require extensive inspection by a large number of personnel to adequately conduct such inspections. This can incur great costs both in the labor of inspectors but also in length down times due to the machinery needing to be taken offline during inspection. These problems are further compounded for machinery and installations in remote or difficult to reach areas, such as offshore or remote areas, which can be difficult to access and service in a timely manner.

SUMMARY

Described herein are techniques for inspection management in a movable object environment. Embodiments provide an inspection application that can autonomously perform inspection of target objects using a movable object. Such autonomous inspection can be performed without training on flight or usage of the movable objects. The inspection application can receive data through one or more interfaces and use this data to generate one or more inspection missions. When a user selects an inspection mission in the inspection application, the movable object can be instructed to perform the selected inspection mission. The movable object can follow one or more dynamically generated paths around a target object and capture a plurality of images. The images can be viewed in a viewing application to perform an inspection of the target object.

In some embodiments, the movable object can use the dynamically generated paths during unplanned mission interruptions, such as to perform a battery swap or in case of a malfunction in the movable object. The dynamically generated paths enable the movable object to safely navigate and inspect a target object without requiring additional sensor data, such as a LiDAR or visual system, to avoid collisions. In some embodiments, the inspection techniques described herein may be combined with LiDAR or other sensor systems to further improve inspection of the target object.

BRIEF DESCRIPTION OF DRAWINGS

FIGS. 6A-6C illustrate examples of an unmanned aircraft determining mission attributes based on a target object, in accordance with various embodiments.

FIG. 7 illustrates an example of a preflight user interface, in accordance with various embodiments.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes aerial inspection of a target object using a movable object. For simplicity of explanation, an unmanned aerial vehicle (UAV) is generally used as example of a movable object. It will be apparent to those skilled in the art that other types of movable objects can be used without limitation.

In accordance with various embodiments, one or more movable objects may be used to perform inspection of one or more target objects in a movable object environment. An inspection application can receive data through a graphical user interface and use this data to generate one or more inspection missions. When a user selects an inspection mission in the inspection application, a movable object can be instructed to perform the selected inspection mission. The movable object can follow one or more dynamically generated paths around a target object and capture a plurality of images. The images can be viewed in a viewing application to perform an inspection of the target object.

Figure 1:
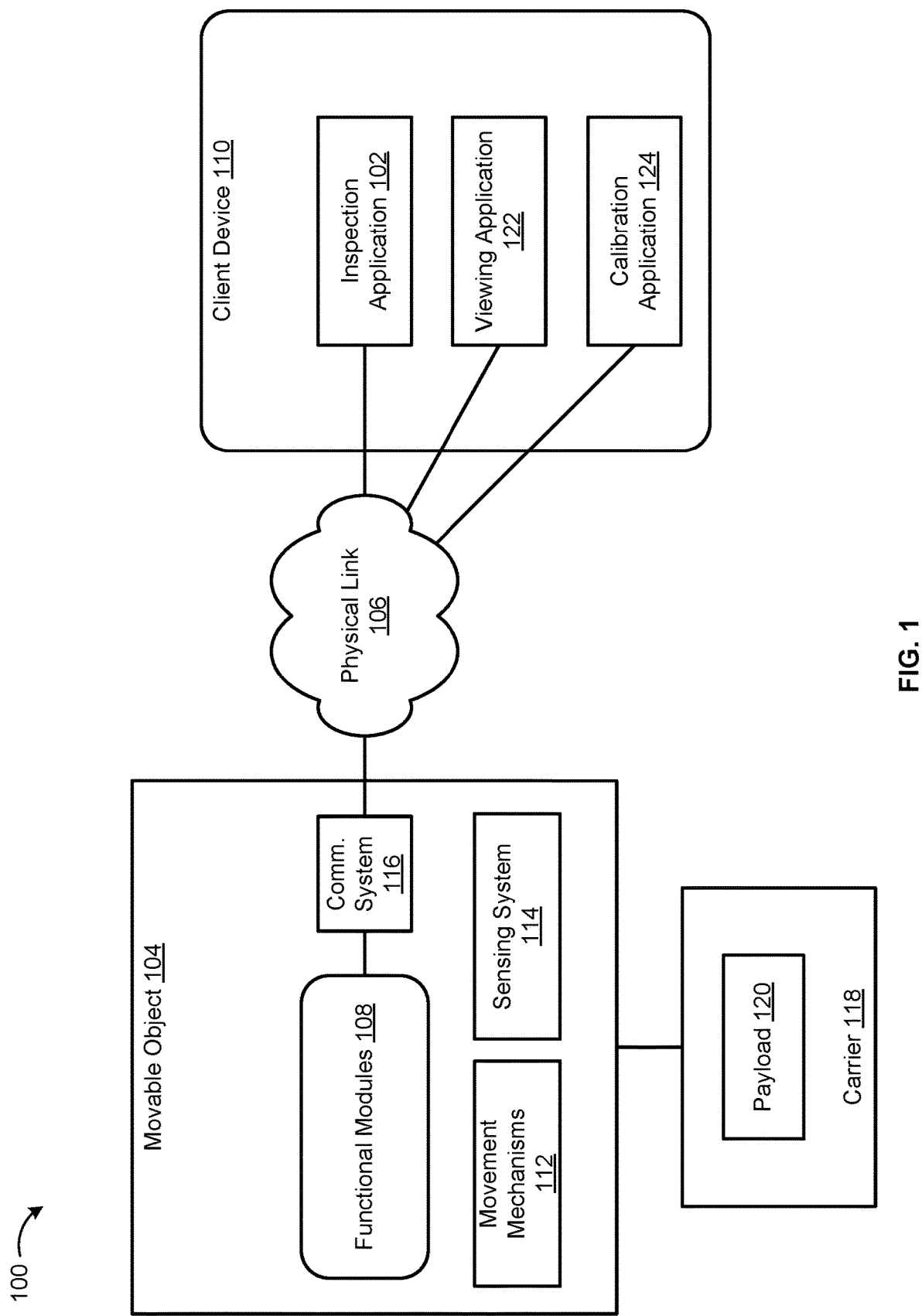
FIG. 1 illustrates an example of inspection and viewing applications in a movable object environment, in accordance with various embodiments.

As shown in FIG. 1, the inspection application 102 can be deployed on a client device 110. For example, the client device 110 can be a portable personal computing device (such as a tablet computing device, laptop, or other portable computing device), a smart phone, a remote control, and/or a personal computer. In some embodiments, inspection application 102 can include a user interface (UI) through which one or more types of inspections may be defined. As discussed further with respect to FIG. 2, an inspection application can use information received from a user or captured by the movable object to define one or more inspection missions. In some embodiments, the movable object may capture information about the target object to be inspected through a calibration phase. Calibration may be performed on one or more portions of the target object in one or more calibration phases, with different target objects having different portions and therefore different phases. Calibration may be managed by inspection application 102 or may be performed by a calibration application 124. In various embodiments, the inspection application may dynamically determine a path for the movable object to travel during an inspection mission. Such a path may vary depending on the type of movable object in use, weather conditions, the object being inspected, etc.

Additionally, the client device 110 can include a communication device (not shown), which is responsible for handling the communication between the inspection application 102 on the client device 110 and various modules 108 on the movable object 104. For example, an unmanned aircraft can include uplink and downlink. The uplink can be used for transmitting control signals, the downlink can be used for transmitting media or video stream.

In accordance with various embodiments, the physical link 106 can be (part of) a network, which is based on various wireless technologies, such as the Wi-Fi, Bluetooth, 3G/4G, and other radio frequency technologies. Furthermore, the physical link 106 can be based on other computer network technologies, such as the internet technology.

In various embodiments, movable object 104 in a movable object environment 100 can include a carrier 118 and a payload 120. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on (e.g., incorporated with or attached to) the movable object 104 without requiring the carrier.

In accordance with various embodiments, the movable object 104 may include one or more movement mechanisms 112 (e.g. propulsion mechanisms), a sensing system 114, and a communication system 116. The movement mechanisms 112 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 112 can be mounted on the movable object 104 (or vice-versa), using any suitable means such as a support element (e.g., a drive shaft). The movement mechanisms 112 can be mounted on any suitable portion of the movable object 104, such on the top, bottom, front, back, sides, or suitable combinations thereof.

In some embodiments, the movement mechanisms 112 can enable the movable object 104 to take off vertically from a surface or land vertically on a surface without requiring any horizontal movement of the movable object 104 (e.g., without traveling down a runway). Optionally, the movement mechanisms 112 can be operable to permit the movable object 104 to hover in the air at a specified position and/or orientation. One or more of the movement mechanisms 112 may be controlled independently of the other movement mechanisms, for example by inspection application 102. Alternatively, the movement mechanisms 112 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation).

The sensing system 114 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing system 114 may include RADAR, LiDAR, or other electromagnetic sensors, e.g., for use in object detection and avoidance. In some embodiments, the sensing system 114 may include a rangefinder, such as a laser-, sonar-, and/or optical-based rangefinder. The sensing data provided by the sensing system 114 can be used to control the spatial disposition, velocity, and/or orientation of the movable object 104 (e.g., using a suitable processing unit and/or control module). Alternatively, the sensing system 114 can be used to provide data regarding the environment surrounding the movable object, such as weather conditions, proximity to potential obstacles, location of geographical features, location of manmade structures, and the like. In some embodiments, the sensing system 114, or sensors included therein, may be included as part of payload 120 in carrier 118. This may allow for various sensors to be moved relative to movable object 104.

The communication system 116 enables communication with inspection application 102 executing on client device 110 via physical link 106, which may include various wired and/or wireless technologies as discussed above. The communication system 120 may include any number of transmitters, receivers, and/or transceivers suitable for wireless communication. The communication may be one-way communication, such that data can be transmitted in only one direction. For example, one-way communication may involve only the movable object 104 transmitting data to the inspection application 102, or vice-versa. The data may be transmitted from one or more transmitters of the communication system 110 to one or more receivers of the client device, or vice-versa. Alternatively, the communication may be two-way communication, such that data can be transmitted in both directions between the movable object 104 and the client device 110. The two-way communication can involve transmitting data from one or more transmitters of the communication system 116 to one or more receivers of the client device 110, and vice-versa.

In some embodiments, the inspection application 102 can provide control data to one or more of the movable object 104, carrier 118, and payload 120 and receive information from one or more of the movable object 104, carrier 118, and payload 120 (e.g., position and/or motion information of the movable object, carrier or payload; data sensed by the payload such as image data captured by a payload camera; and data generated from image data captured by the payload camera). For example, the control data may correspond to one or more inspection missions being performed by the movable object. In some instances, control data from the application may include instructions for relative positions, movements, actuations, or controls of the movable object, carrier, and/or payload. For example, the control data may result in a modification of the location and/or orientation of the movable object (e.g., via control of the movement mechanisms 112), or a movement of the payload with respect to the movable object (e.g., via control of the carrier 122). The control data from the application may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). Although embodiments may be described that include a camera or other image capture device as payload, any payload may be used in various embodiments. In some embodiments, inspection application 102 may be configured to control a particular payload.

In some instances, the communications from the movable object, carrier and/or payload may include information from one or more sensors (e.g., of the sensing system 114 or of the payload 120) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

In some embodiments, where payload 120 includes an image capture device, images of an object may be captured according to a current mission definition being executed by the movable object 104. The images may be stored on the movable object 104 or payload 120 for later download. In some embodiments, the images may be transmitted wirelessly to client device 110. For example, images may be stored to removable media on movable object 104. At the end of a mission, the removable media may be removed and replaced with blank media and the movable object may execute its next mission. The removed media may then be read by client device 110 and viewed through viewing application 122. Additionally, or alternatively, a wired or wireless connection can be made to movable object 104 at the end of its mission to download the data to client device 110. As discussed, viewing application 122 may include a user interface enabling a user to view each image captured by the movable object. The images may each depict different and/or overlapping portions of a target object. Using the viewing application, the target object can be inspected to identify potential faults or maintenance needs. Although the same client device is depicted as executing both inspection application 102, viewing application 122, and calibration application 124, this is for ease of illustration and not intended to be limiting. In various embodiments, viewing application 122 and calibration application 124 may be executed by a separate client device from inspection application 102. In some embodiments, all or some of the functionality of viewing application 122 and/or calibration application 124 may be provided as modules of inspection application 102.

Figure 2:
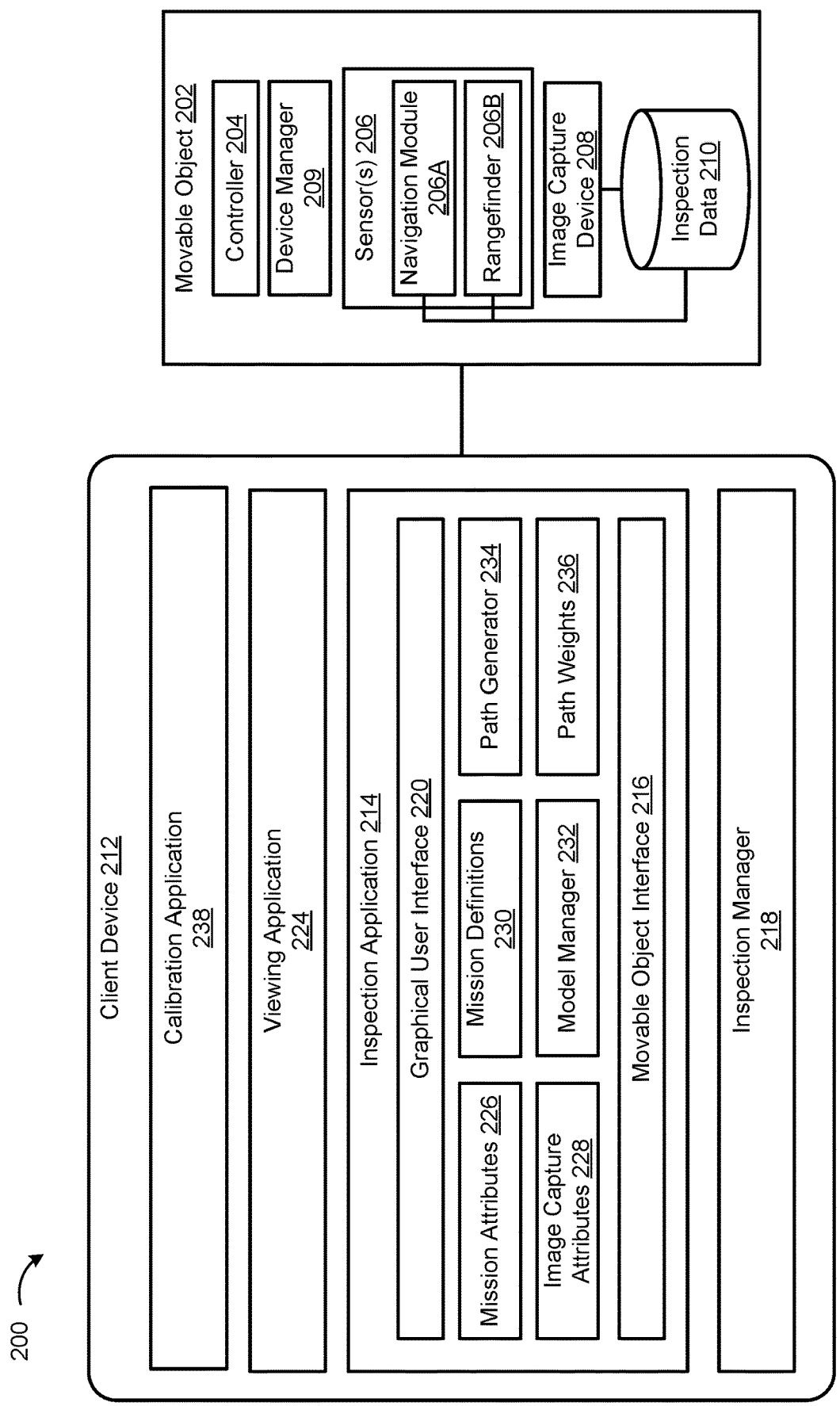
FIG. 2 illustrates an example of an inspection application and an inspection manager in a movable object environment, in accordance with various embodiments.

FIG. 2 illustrates an example of an inspection application and an inspection manager in a movable object environment 200, in accordance with various embodiments. A movable object 202 can include an unmanned aircraft, an unmanned vehicle, a handheld device, and/or a robot. Movable object 202 can include a controller 204, such as a flight controller, that can control the navigation of the movable object and limit the movement of the movable object based on mission definitions and flight paths received from the inspection application. Movable object 202 may also include one or more sensors 206, which may produce sensor data. As noted above, the one or more sensors 206 can include any sensors, including location sensors, motion sensors, inertial sensors, proximity sensors, or image sensors. For example, sensors 206, may include a navigation module 206A. Navigation module 206A may include a global positioning system (GPS) module, or other ground- or satellite-based location sensor such as a BeiDou Navigation Satellite System (BDS) module, or other module capable of communicating with a global or regional positioning system. module 206A may be a high-precision GPS system configured to provide centimeter-level or sub-centimeter-level accuracy of movable object 202. For example, in some embodiments, navigation module 206A may include a real time kinematic (RTK) satellite navigation system. An RTK navigation system may include a base station, whose location is well known, in communication with multiple user devices. The base station may determine its location and one or more corrections based on a carrier wave received from a satellite. The base station may transmit its location and the one or more corrections to user devices within range of the base station. This enables the user devices to establish their own locations with high precision (e.g., with centimeter or sub-centimeter accuracy). In some embodiments, sensors 206 may include RADAR, LiDAR, or other electromagnetic sensors. For example, sensors 206 may include rangefinder 206B. Rangefinder 206B may include an acoustic rangefinder, such as an ultrasonic, infrasonic, or SONAR based rangefinder, a laser or optical rangefinder, or other active or passive range finding sensor or sensors. The sensor data 208 can be used to control the spatial disposition, velocity, and/or orientation of the movable object 202. In some embodiments, sensors 206 may collect state information about the movable object 202, such as battery level, signal strength (e.g., remote control signal strength, video signal strength, GPS signal strength, etc.), and other information. Additionally, or alternatively, sensors 206 can collect data regarding the environment surrounding the movable object 202, such as weather conditions, proximity to potential obstacles, location of geographical features, location of manmade structures, and the like. Movable object 202 may include an image capture device 208. As discussed, the image capture device may be fixedly coupled to the movable object or may be included in the payload of a carrier coupled to the movable object. In various embodiments, such a carrier may be controlled independently of the movable object. The image capture device 208 can capture images of a target object based on image capture attributes received from an inspection application. The images may be stored in inspection data 210. In various embodiments, inspection data 210 may include image data as well as image metadata, such as data describing the location, position, attitude, etc. of the movable object and/or carrier.

Movable object 202 can receive instructions from, and provide inspection data to, client device 212. Client device 212 can include a desktop or laptop computer, tablet computer, smartphone, or other mobile device, wearable computer, virtual reality system, or another client device. In various embodiments, a user may interact with client device 212 through a touchscreen interface using one or more fingers, a stylus, etc. Gesture-based inputs may also be supported via the touchscreen interface. In some embodiments, user and/or client device motion (e.g., using accelerometers, gyroscopes, eye tracking sensors, gaze tracking sensors, hand tracking sensors, etc.) may be monitored and used to provide inputs to the client device. Audible commands may be similarly supported for providing inputs to the client device. For example, a wearable client device may include a head mounted display, which may include one or more eye and/or gaze tracking sensors to monitor where the user is looking, as well as accelerometers and gyroscopes to monitor use movement. The user may further interact with such a device through a handheld controller, gaze-based gestures, voice commands, etc. Client device 212 can include an inspection application 214. Although the embodiment shown in FIG. 2 shows inspection application 214 deployed to client device 212, in some embodiments, inspection application 214 can be deployed to one or more servers and manage inspection services for multiple client devices remotely. Additionally, or alternatively, inspection application 214 may manage inspection missions being executed substantially simultaneously by multiple movable objects. Although embodiments are described with respect to inspection application 214 executing primarily on client device 212, all or a portion of the functionality of inspection application 214 may execute on movable object 202.

In some embodiments inspection application 214 can be implemented using a software development kit (SDK), or mobile SDK, which is used for supporting the development of software applications in the movable object environment 200. Inspection application 214 can use one or more interfaces to communicate with other systems in the movable object environment. For example, movable object interface 216 can facilitate communication of data and instructions between the inspection application and one or more components of the movable object, as discussed herein, through inspection manager 218. Inspection manager 218 may be a data manager that receives data and/or instructions from the inspection application or movable object, and packs/unpacks the data and/or instructions for the movable object or inspection application. In some embodiments, inspection application 214 and viewing application 224 can each be developed by the same or different application developers and can each be configured by its developer to provide a user interface for operating and/or communicating with the movable object 202. Developers may include internal developers, third party developers, end users, etc. In some embodiments, inspection manager 218 can enable inspection application 214 to subscribe to sensor data available from sensors 206. In some embodiments, an onboard SDK, such as device manager 209, may facilitate communication between sensors 206, inspection data 210, and other data gathered by movable object 202 and inspection application 214.

Inspection application 214 may determine mission attributes 226 and image capture attributes 228 through graphical user interface 220. In some embodiments, these attributes may collectively be referred to as mission attributes. The mission attributes may include data associated with the target object being inspected. An example target object is a wind turbine. The mission attributes for a wind turbine may include the dimensions and location of the corresponding wind turbine, as well as the heading and altitude of the wind turbine. The image capture attributes may include a selection of which components of the target object to inspect, the amount of overlap to be included in each captured image, a safety distance, and a start and stop distance. In some embodiments, the image capture attributes may be preconfigured, determined, and/or updated by the movable object on site, based on other mission attributes 226.

Based on the mission attributes and the image capture attributes, one or more mission definitions may be generated. The mission may include a number of positions or dots arranged around the target object at the safe distance. The mission may involve directing the movable object to each position in turn, capturing an image at the position, and moving on to the next position. In some embodiments, each position may be associated with a location, as well as control information for the movable object, image capture device and/or carrier. For example, each position may be associated with a heading or change in heading from a previous position for the movable object, and/or pitch, attitude, or other directional data for the movable object and/or carrier to ensure the image capture device is correctly positioned to photograph the target object. In some embodiments, mission definitions 230 may utilize target object models maintained by model manager 232. These models may include CAD drawings or similar predefined models or may include models generated based on sensor data received from movable object 202. The models in model manager 232 can be placed into a coordinate system representing the movable object environment to which the movable object is deployed. The dots or positions may then be arrayed about the model to correspond to actual positions in space. In some embodiments, each dot or position may be associated with a location in space that is relative to the coordinates of the model (e.g., a center-point of the mast). Once the coordinates of the target object are determined (e.g., received through the GUI or determined by the movable object on site), the location of each dot or position may be translated into locations in real space around the target object. The selected mission may then be performed using the movable object, as described further below.

In some embodiments, movable object interface 216 is movable object-aware such that it knows the type of movable object to which it is connected. Movable object interface 216 may receive data that indicates the type of the movable object to the inspection application. The data indicating the type of movable object may be an identifier associated with particular path weights 236 and/or may be control data or other movable object data that is strongly correlated with a particular type of movable object. The path weights can be based on the flight characteristics of the movable object as well as environmental conditions, or other factors. For example, one movable object may most efficiently travel in a straight line, while a second movable object may most efficiently travel diagonally. Path generator 234 may implement one or more pathfinding algorithms which may be used to dynamically generate paths based on the weight value for each dot. In some embodiments, path generator 234 may generate a path based on one or more predefined paths that may not rely on movable object-specific path weights. For example, a predefined path may be defined as one or more routes to follow through the array of positions, such as moving up from a starting point through each position in a vertical line, returning to the starting point, moving one position clockwise (or counterclockwise) from the starting point, and then moving up through each position in a vertical line above the new position of the movable object. This enables the movable object to reposition itself at ground level, where conditions may be more favorable. Alternatively, a predefined path may be defined as moving up from a starting point through each position in a vertical line, moving one position clockwise (or counterclockwise) at the highest-most position, and then moving down through each position in a vertical line. This reduces inspection time, as the path does not include repeated movements. In some embodiments, alternative predefined paths may be enabled by the flight controller based on the flight characteristics of a particular movable object.

As shown in FIG. 2, in some embodiments, client device 212 may include a calibration application 238. As discussed, calibration may be performed on one or more portions of a target object in one or more calibration phases to determine target object attributes. In some embodiments, calibration may be used to verify/correct the target object attributes received previously, instead of determining all attributes of the target object. For example, where a subset of target object attributes has been received (e.g., from the user, a 3D model, or a barcode of the target object), calibration may be used to determine only the unspecified attributes. Although depicted as a separate application, in some embodiments, calibration application 238 may be a module of inspection application 214. This enables a first movable object to calibrate one or more target objects, and a second drone to inspect the calibrated objects. Additionally, or alternatively, the same movable object may first calibrate a target object and then begin inspection of the same target object.

As discussed, some or all of the functionalities described herein, such as some or all of the functionality of calibration application 238 and inspection application 214 (e.g., mission definitions 230, path generator 234, etc.) may be implemented by the movable object 202 instead of or in addition to the client device 212.

Although embodiments are discussed herein with respect to a movable object, such as an unmanned aerial vehicle, this is for simplicity of explanation. Embodiments may be used to provide various elements and services to various devices.

Figure 3:
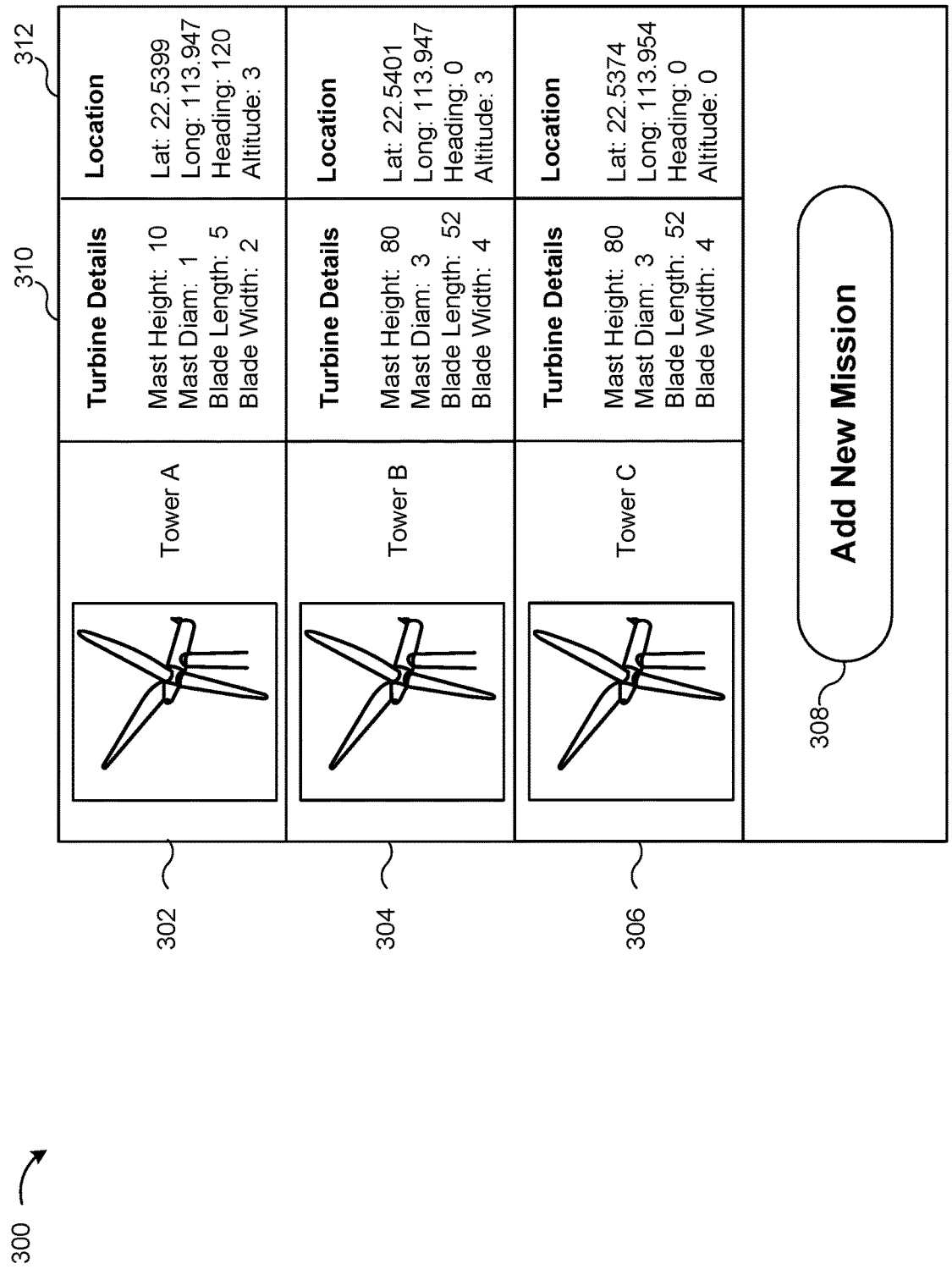
FIG. 3 illustrates an example user interface for selecting an inspection mission, in accordance with various embodiments.

FIG. 3 illustrates an example user interface for selecting an inspection mission, in accordance with various embodiments. As shown in FIG. 3, a first user interface 300 can include a list of selectable inspection missions 302-306. Each inspection mission may be defined for a particular target object. Although examples discussed herein may be described with respect to wind turbines and the inspection of wind turbines, the inspection techniques described herein may equally be applied to any target object. As shown, each inspection mission can indicate mission attributes, such as Turbine Details 310 and Location 312, determined for that mission. As shown, the mission attributes may include dimensions and location of the corresponding wind turbine, as well as the heading and altitude of the wind turbine. In some embodiments, an inspection mission may be defined for a particular type of target object and the location of the target object may be determined at the start of the inspection mission. For example, a movable object may use a GPS system or other location sensors to determine the location of the target object. Based on these attributes, a mission can be generated for the target object. In some embodiments, for a different wind turbine of the same time, some of the attributes can be reused (e.g., the diameter, blade length, etc.), and the location, heading, altitude attributes can be updated and a new mission for the wind turbine can be saved.

Each inspection mission 302-306 may include mission attributes that were previously determined for the corresponding target object. Once mission attributes have been determined for a particular target object, they may be stored in a mission definition for the target object (e.g., as a file, database entry/table, or other data structure). Unless there is a change made to the target object (e.g., if a turbine is replaced by a different model turbine), the previously determined mission attributes may continue to be used in future inspection missions. As shown in FIG. 3, the user interface 300 can include an option 308 to create a new mission. For example, if a new wind turbine is going to be inspected, the mission attributes for the new turbine need to be determined. As discussed further below, mission attributes may be received from a user through a user interface, determined by the movable object using one or more sensors, scanned from barcode associated with the target object, or any combination thereof.

Figure 4A:
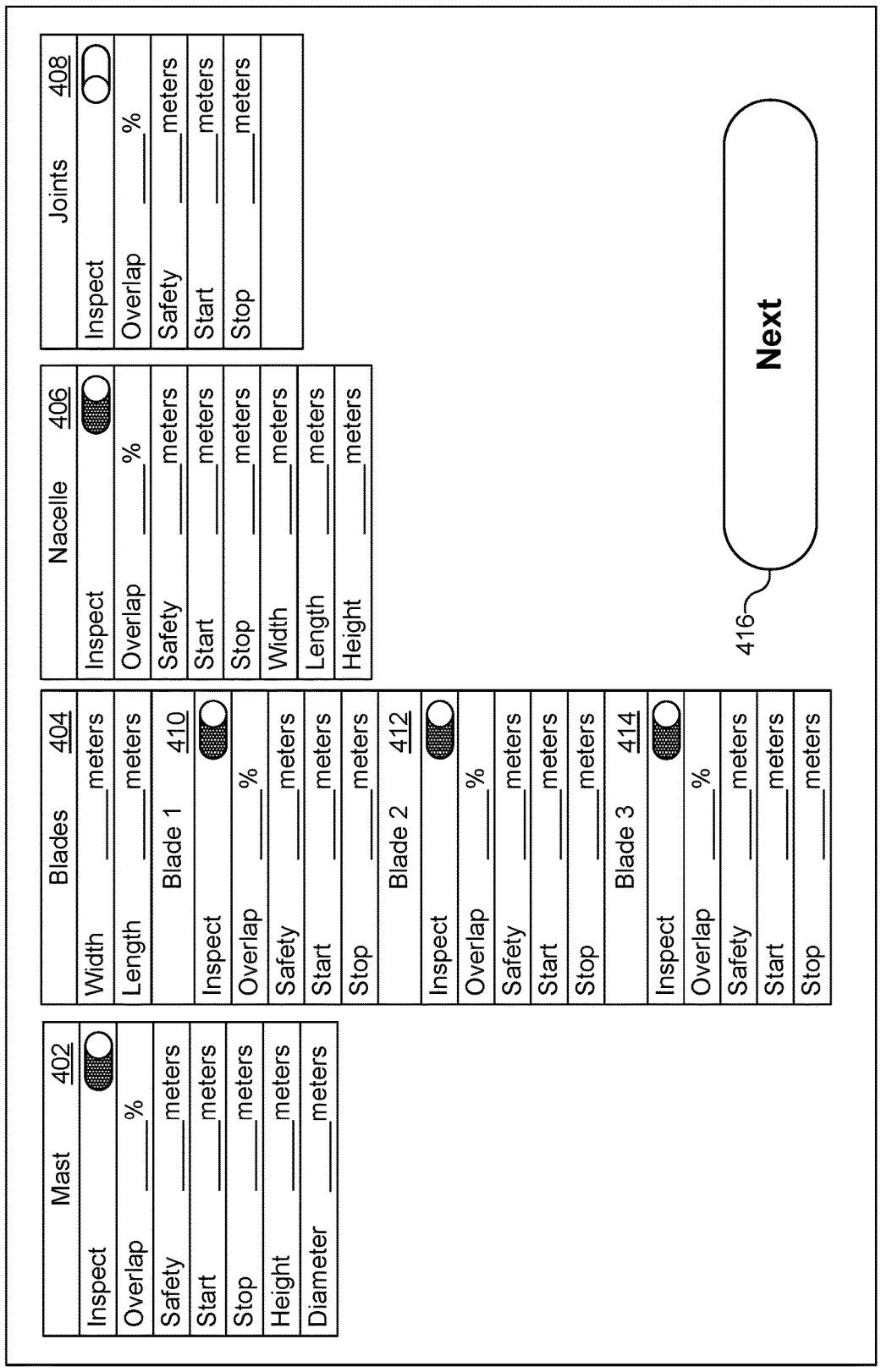
FIGS. 4A and 4B illustrate examples of user interfaces through which mission attributes may be received, in accordance with various embodiments.
Figure 4B:
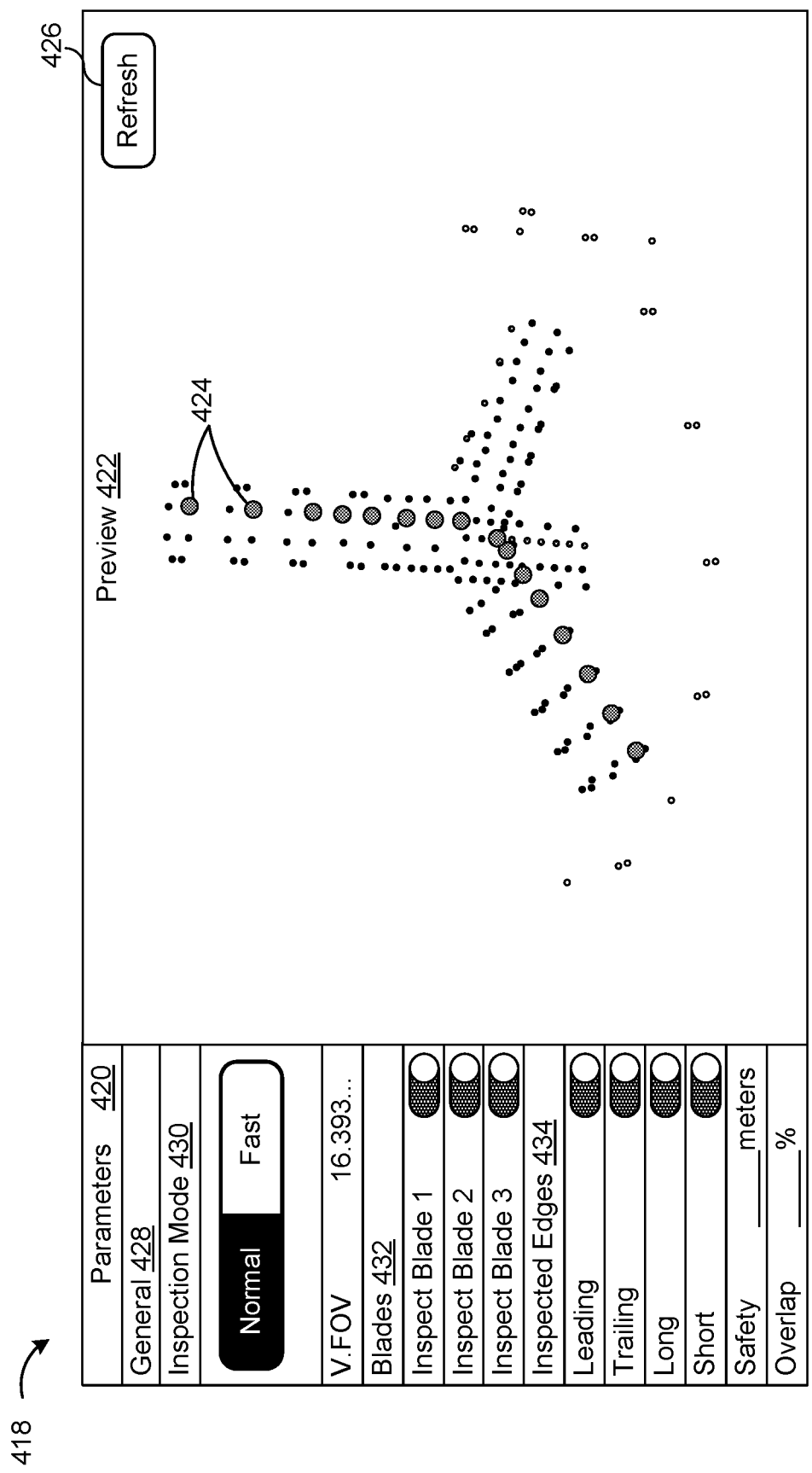

FIGS. 4A and 4B illustrate examples of user interfaces through which mission attributes may be received, in accordance with various embodiments. As shown in FIG. 4A, once an existing mission has been selected, or when a new mission is being defined, the mission can be configured with various mission attributes through configuration interface 400. As shown, the mission attributes may include inspection and image capture attributes. For example, various components of the target object may each be configured prior to executing the selected mission. In this example, the target object is a wind turbine which includes a mast 402, blades 404, a nacelle 406, and joints 408. More or fewer components may be defined depending on the target object to be inspected and the particular implementation or requirements of the inspection mission. In some embodiments, attributes may be provided for each blade 410-414 separately. For each component, a user may define whether to inspect the component, the amount of overlap to be included in each captured image, a safety distance, and a start and stop distance. As discussed, a substantially cylindrical region can be defined around each component, centered on the location of the component and having a radius approximately equal to the safety distance. In some embodiments, the cylindrical region may generally track the shape of the object being inspected. For example, LiDAR sensors and or a rangefinder on the movable object may enable it to maintain the safety distance from the target object, even where the target object curves or otherwise has irregular dimensions. Once the components to be inspected have been configured, the user can select next 416 to move to a new interface screen.

FIG. 4B shows an alternative user interface 418 through which a mission may be configured. Like in FIG. 4A, once an existing mission has been selected (e.g., once an existing target object has been selected), various mission attributes may be specified via parameters panel 420. Additionally, a preview panel 422 can include a visualization of the selected mission based on the parameters. The visualization depicted in FIG. 4B includes a plurality of dots which represent locations in space around a target object which the movable object may occupy during the selected inspection. These dots do not exist in physical space, but instead represent locations in physical space. In some embodiments, preview panel 422 may additionally include a predicted path, depicted here by enlarged dots, including dots 424. As mission attributes are added and/or modified in parameters panel 420, refresh button 426 can be selected to show a new visualization and predicted path, in accordance with the new mission attributes. As shown, parameters panel 420 may include general mission attributes 428 including an inspection mode 430. In some embodiments, different inspection paths and/or dot locations may be associated with each inspection mode. For example, a fast inspection mode may include fewer, or a less dense arrangement of, dots around the target object, while the normal inspection mode may include more, or a more dense arrangement of, dots. As further shown, the user may select which portions of the target object are to be inspected. For example, blades 432 can include selectable elements for each blade of the target object which may be inspected (e.g., Blade 1, Blade 2, and Blade 3). The selectable elements may be selected to determine whether the corresponding blade is to be inspected during the mission. In some embodiments, additional information may be provided for each blade. For example, the blades may be identified by orientation, such as top blade, 120° blade, and 240° blade. Additionally, inspected edges 434 can include selectable elements for various edges, such as leading, trailing, long, or short edges. The selectable elements may be selected to determine whether the corresponding edge is to be inspected during the mission.

FIGS. 5-6 illustrate examples of an unmanned aircraft determining mission attributes based on a target object, in accordance with various embodiments. As discussed above, all or a portion of mission attributes for a target object may be specified by a user, scanned or otherwise read from a computer readable medium associated with the target object, or otherwise be received by the movable object through a user interface. In some embodiments, the movable object may be configured to determine attributes that have not been received. Examples are discussed further below with respect to FIGS. 5-6.

Figure 5A:
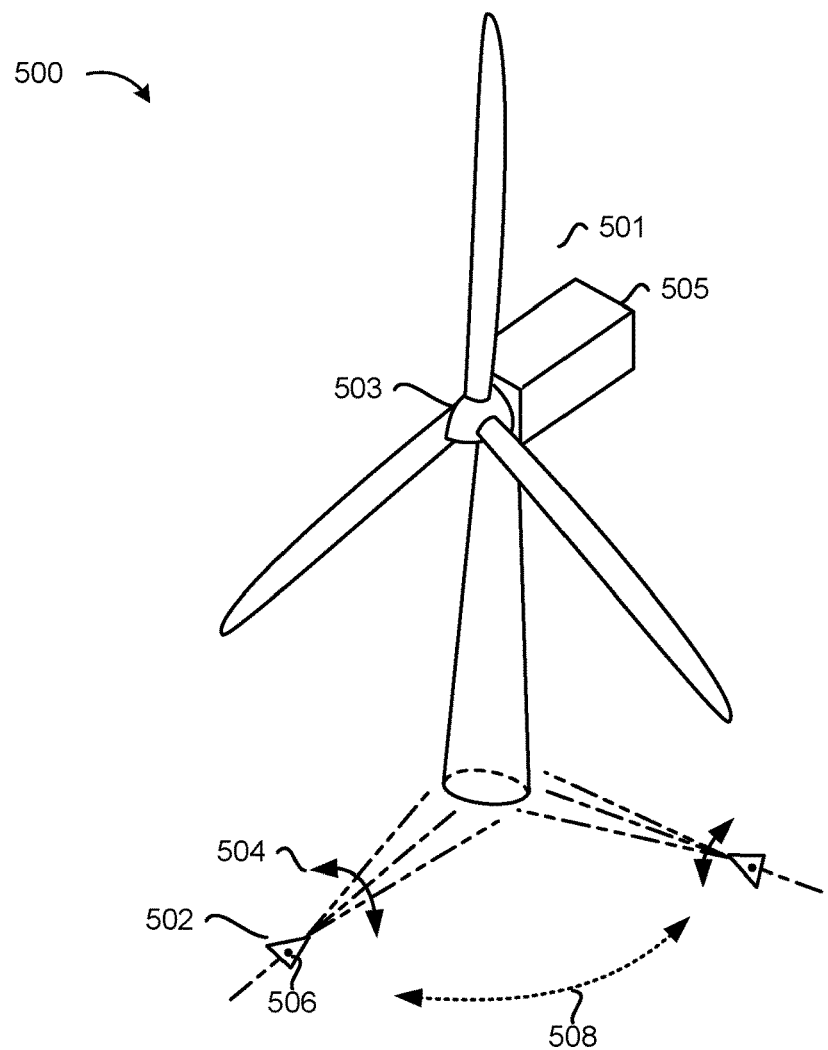
FIGS. 5A and 5B illustrate examples of an unmanned aircraft determining mission attributes based on a target object, in accordance with various embodiments.
Figure 5B:
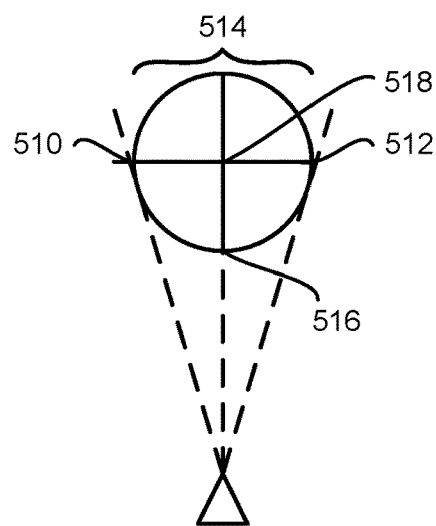

FIGS. 5A and 5B illustrate examples 500 of an unmanned aircraft determining mission attributes based on a target object, in accordance with various embodiments. As discussed above, target object attributes may be received in a variety of ways. For example, a user may provide the attributes through a user interface, a 3D model (e.g., a CAD model) of the target object may be obtained including at least some attributes of the target object (e.g., its dimensions), or a computer readable identifier (e.g., a barcode, QR code, or other identifier) associated with the target object may be scanned to obtain one or more attributes. In some embodiments, attributes may be encoded in one or more computer readable identifiers and/or links, such as web links, may be encoded in the one or more computer readable identifiers which, when scanned, cause the attributes associated with those links to be received (e.g., downloaded from one or more server and/or data store locations).

However, target object attributes may not always be correct or up to date. For example, manually entered attributes are subject to user error. Additionally, attributes may become outdated as changes are made to the corresponding target object. Accordingly, embodiments enable various attributes of a target object to be measured on site by the movable object. Additionally, embodiments enable these attributes to be measured using a rangefinder, rather than an expensive LiDAR system. As discussed further below, using a rangefinder and measurement techniques, allow for accurate measurements to be obtained quickly without requiring significant retooling of existing movable objects. Once the target object attributes have been measured and/or confirmed, the movable object may perform inspection of the target object autonomously.

As discussed herein, measurements of target object attributes may be referred to as calibration. Calibration may be performed on one or more portions of a target object in one or more calibration phases, with different target objects having different portions and therefore different phases. In some embodiments, calibration may be used to verify/correct the target object attributes received previously, instead of determining all attributes of the target object. For example, where a subset of target object attributes has been received (e.g., from the user, a 3D model, or a barcode of the target object), calibration may be used to determine only the unspecified attributes. Although embodiments are discussed with respect to calibration of wind turbines, similar calibration phases may be defined for alternative target objects and performed using similar techniques to those discussed.

As shown in FIG. 5A, a movable object 502 may be placed at a safe distance in front of a target object 501, in this example a wind turbine. The initial phase of calibration shown in FIGS. 5A and 5B may be to determine the location of the target object (e.g., the center point of its mast). Locations of wind turbines are generally known by their operators; however, the accuracy of these locations may be inadequate for inspection purposes. By calibrating the target object to determine a more accurate location, inspection missions can be performed more quickly and more safely. As shown, movable object 502 may be placed substantially aligned with the heading of the wind turbine (e.g., in line with the hub 503 and nacelle 505). In some embodiments, a safe distance may be approximately twenty meters, but may vary on the order of several meters depending on environmental conditions, the types and number of rangefinders in use, etc. In various embodiments, the movable object may be equipped with a real time kinematic (RTK) system (e.g., a carrier phase enhancement GPS) to provide centimeter-level, or sub-centimeter-level location tracking of the movable object.

To begin calibration, the movable object 502 can take off vertically and hover. The height at which the movable object hovers may be configurable and may vary from less than a meter to several meters. With the range finder pointed straight in front of the movable object, the movable object may yaw 504 to the left and right about the Z axis 506 of the movable object while collecting range data. As shown in FIG. 5B, the two edges 510, 512 and the closest point (e.g., peak of the mast) 516, can be identified based on the range measurements. For example, the peak of the mast 516 can be identified as the point having the shortest range, while the edge points can be identified as points at the boundary where range measurements became discontinuous (e.g., where the detected range measurements increased significantly). In some embodiments, several range measurements before the discontinuity may be averaged to determine an approximate boundary point. In some embodiments, if the measured distances for each boundary point 510, 512 vary more than a configured delta value, the movable object may not be positioned correctly (e.g., off-center) and an error message may be returned to reposition the movable object.

As the location of the movable object and its current direction are known, the measured distances from the movable object of each of these boundary points can be combined with the movable object's direction to determine their locations in real space. Using these coordinates, the diameter 514 and radius of the mast can be determined. By adding the radius to the point 516 closest to the movable object, the coordinates of the center of the mast 518 can be approximated. This process may be repeated after moving 508 the movable object about 90 degrees around the mast, as shown in FIG. 5A. The results of this additional measurement can be compared to previously calculated values. In some embodiments, the measured coordinates may be averaged and used as the center point of the mast. In some embodiments, depending on the difference between the first two measured coordinates, then additional measurements may be taken at 90 degrees, or other intervals.

FIGS. 6A-6C illustrate examples of an unmanned aircraft determining mission attributes based on a target object, in accordance with various embodiments. FIG. 6A shows a side view of target object 501. As shown in FIG. 6A, a second phase of the calibration can be performed to determine a location of the hub 503 relative to the center point of the mast 518. In performing the second phase, the height of the center of the hub above the ground can be determined as well as a distance between the center of the hub and the center of the mast. Movable object 602 can measure its range 604 to the mast using one or more rangefinders as discussed. The movable object can then begin climbing vertically 606 until a significantly shorter range 608 is measured. As shown, this corresponds to the beginning of the hub. Once the start point of the hub has been detected, the hub may be profiled. Like in FIGS. 5A and 5B, the movable object may measure a distance to the hub as it travels vertically. The point having the shortest measured distance 614 corresponds approximately to the center of the hub, as hubs typically have spheroid or ellipsoid shapes. The range may continue to be measured until another discontinuity is detected (e.g., the range increases significantly), this represents the upper edge of the hub. Using the detected lower and upper edges, the diameter of the hub can be determined and the center point approximated, as similarly to that of the mast described above. With the center point of the hub and the center point of the mast known, the distance between them 610 can be determined. Additionally, by determining the size of the hub, the starting point of the blades is known.

As shown in FIG. 6A, movable object 602 can continue climbing vertically to determine the length 616 of the blades 603. FIG. 6B shows a front view of the hub 503 and a blade 603 of target object 501. As shown in FIG. 6B, a hub rotation angle 622 may exist due to limitations in how accurately a wind turbine may be shut down. For example, many wind turbines are shut down manually by one or more operators, resulting in blades that may be rotated slightly off vertical. As such, to traverse the length of the blades, the rangefinder may be used to track the edge of the blade. In some embodiments, this may result in the movable object traveling in a stair-step pattern 620. For example, the movable object may travel vertically until the measurements received from the rangefinder indicate that the rangefinder is no longer in front of the blade. To compensate, the movable object may then move left (or right) until the measured range indicates that the movable object is again in front of the blade. In some embodiments, the movable object may roll left or right to determine the boundaries of the blade. This may additionally enable more complex blade edges to be identified. Range measurements of points along the edge of the blade may be recorded. This may be repeated until the end of the blade is identified. Once the end of the blade has been identified (e.g., once moving the movable object left (or right) no longer detects the blade using the rangefinder), the blade pitch 618 and blade rotation 622 may be calculated. For example, since the vertical component of the blade height 616 and the difference in range 617 are known, the pitch angle 618 may be calculated as the $$\tan^{-1}\frac{\text{range difference } 617}{\text{height } 616}.$$

The rotation angle may be similarly calculated based on blade displacement 624 and height component 625. FIG. 6C shows a top view of hub 503 and nacelle 505. As shown in FIG. 6C, in some embodiments, the dimensions of a nacelle 626 to the mast may be similarly measured, by traversing the side 628 and end 630 of the nacelle by the movable object.

FIG. 7 illustrates an example of a preflight user interface, in accordance with various embodiments. As shown in FIG. 7, a preflight checklist 700 can be displayed. The preflight checklist can include one or more checks that are performed prior to beginning the selected mission. In some embodiments, once mission attributes have been determined (e.g., received through a user interface, received by scanning a computer readable identifier, measured by the movable object using one or more sensors, etc.) the preflight checklist 700 may be performed prior to execution of the mission. As shown, these checks may include confirming the movable object is connected 702, that the location of the movable object has been acquired 704, and that an appropriate remote control is connected 706. In some embodiments, the preflight checklist 700 may further include confirmation that the movable object is properly calibrated 708 to perform the selected mission and that battery levels 712 are adequate to perform the selected mission. The preflight checklist may also include determining that the movable object is positioned safely 710, and that the area is clear for takeoff 712. If some or all of the checks are failed, adjustments may be made to the movable object (e.g., the movable object may be repositioned, a different remote may be paired with the movable object, etc.). If some or all of the checks are passed, the mission may be executed upon receipt of a selection of start 714.

Figure 8:
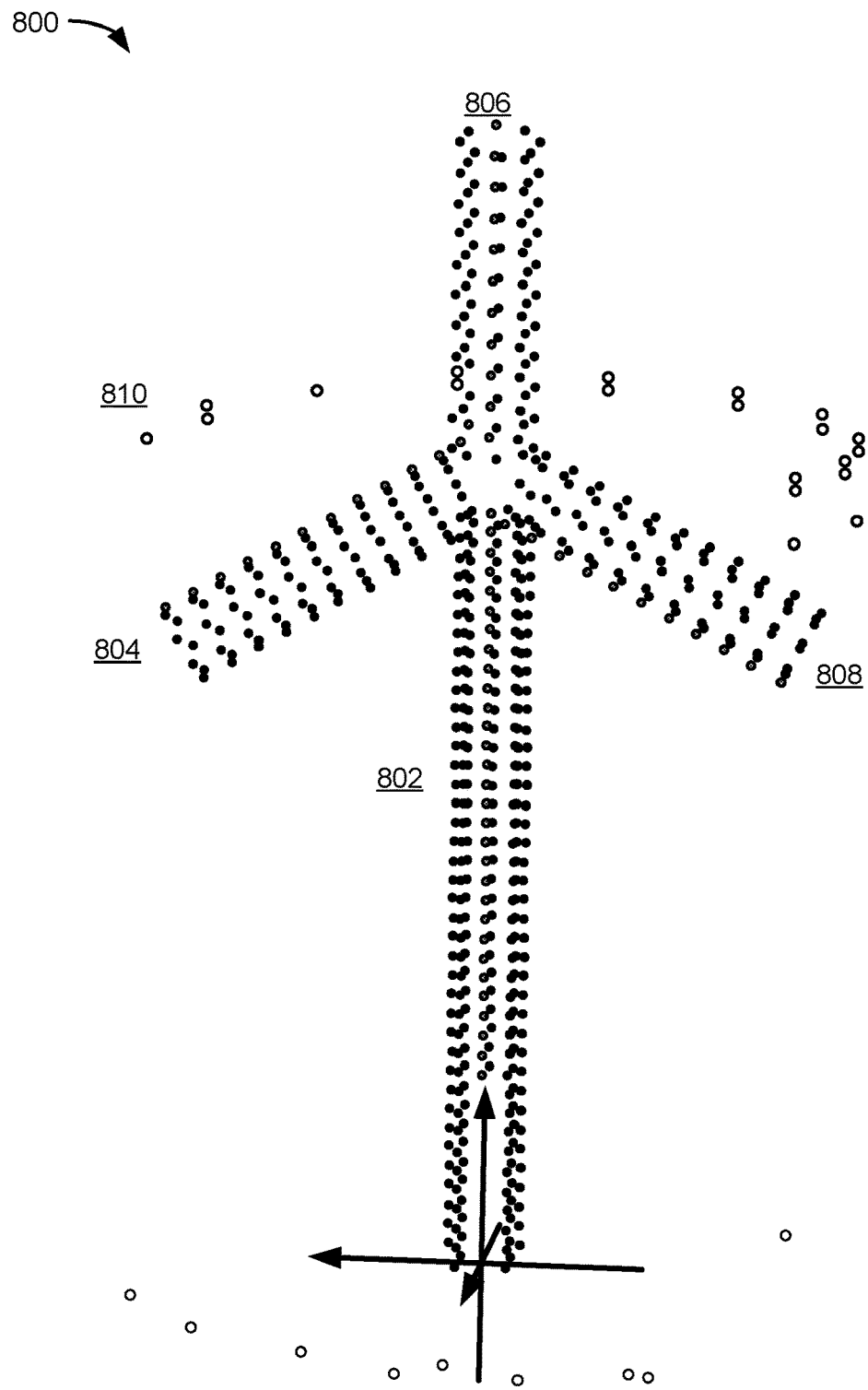
FIGS. 8 and 9 illustrate examples of visualizations of an inspection mission for a wind turbine, in accordance with various embodiments.
Figure 9:
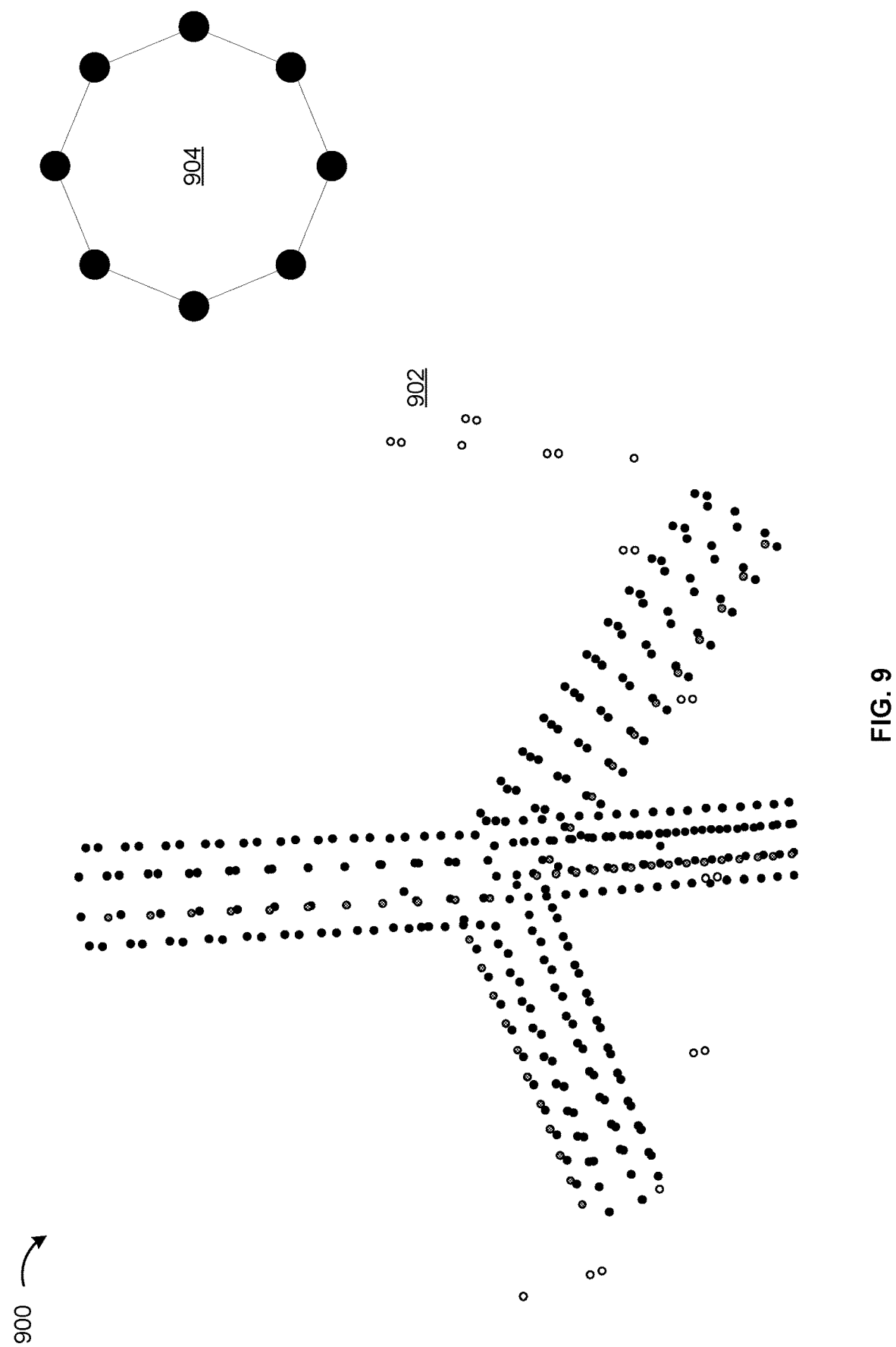

FIGS. 8 and 9 illustrate examples of visualizations of an inspection mission for a wind turbine, in accordance with various embodiments. The visualizations depicted in FIGS. 8 and 9 are provided to illustrate how flight paths may be determined, as further described below. It is also noted that the described dots do not exist in physical space, but instead represent locations in physical space. In some embodiments, such visualizations may be displayed via the inspection and/or visualization applications described herein. As shown in FIG. 8, a visualizer interface 800 may represent a mission as a three-dimensional array of dots around a target object. In some embodiments, each mission may be represented as one or more cylinders, each surrounding a component of the target object. For example, as shown in FIG. 8, a first cylinder of dots 802 covers the inspection mission of the mast of the wind turbine, and cylinders 804-808 each cover inspection missions for the blades of the wind turbine. In some embodiments, each dot can represent a point on a potential flight path of the movable object. In an example, a dot can represent a location at or near which the movable object is to pause/hover for a certain period of time (e.g., to capture one or more images) before resuming its flight. Or, the movable object may simply pass through the location without stopping. Each dot may be positioned at the safety distance away from the surface of the target object. In some embodiments, each dot may be associated with a location, as well as control information for the movable object, image capture device and/or carrier. For example, each dot may be associated with a heading or change in heading from a previous dot for the movable object, and/or pitch, attitude, or other directional data for the movable object and/or carrier to ensure the image capture device is correctly positioned to photograph the target object.

Additionally, some dots may represent safety locations or safe paths when navigating between different areas or components of the target object. For example, dots 810 are located a safe distance from any component of the wind turbine. When the movable object is instructed to move to a different area of the wind turbine, a path to a safe dot 810 can be generated, followed by a path from the safe dot to the new location. The movable object can navigate to the new location along the paths. As discussed, different dots may be associated with different weights depending on, e.g., the type of movable object, weather conditions etc. This enables preferred paths to be identified based on the weights of the dots.

An alternative view 900 of the target object is shown in FIG. 9. As shown in FIG. 9, the safe dots 902 may represent safe locations at the same altitude as the movable object. The safe dots may be determined dynamically while the movable object is in flight, rather than predetermined during mission planning. The safe dots may be predefined based on the dimensions of the target object or determined based on a model of the target object. The model may be received (e.g., as a CAD drawing or other predefined model) or constructed on site based on sensor data gathered by a movable object. If the movable object needs to reach safety (e.g., return to base due to low battery, etc.) the movable object can determine the closest safe dot position and navigate to it. Once in position at the safe dot's location, a safe path can be generated back to base. This allows for safe routes to be dynamically determined, rather than requiring them to be predefined for every possible location of the movable object in space around the target object. Although safe dots 902 are shown as a single ring in the example shown in FIG. 9, in various embodiments, safe positions may be defined as a cylinder, surface, or other geometry around the target object.

As discussed, and as shown in FIGS. 8 and 9, missions may be represented as arrays of dots in substantially cylindrical shapes around a target object or components of a target object. A cross section of such a substantially cylindrical shape is shown at 904. Cross section 904 includes 8 dots, corresponding to 8 locations around a target object 906. Such an arrangement enables photographs to be taken at 45 degree intervals around the target object. For example, target object 906 may represent a mast or blade of a wind turbine. In some embodiments, each dot in cross section 904 may correspond to a location that is defined relative to a center point of target object 906. Once the center point of a given target object (or component of a target object) is determined, the locations in real space of each dot can be determined from the relative locations. As shown, multiple layers of dots may be combined to form the substantially cylindrical inspection missions shown in FIGS. 8 and 9. In various embodiments, the distance between layers may be determined based on the overlap parameter associated with the inspection mission's mission attributes. These cylindrical missions provide a coarse, but safely navigable, approximation of target objects that are similarly shaped. However, some target objects may not be able to be inspected due to their shapes not conforming to a cylinder or other easily defined shape. In some embodiments, dots may be defined throughout a space surrounding the target object. For example, a cubic lattice of dots spaced equally apart may be defined around the target object. Using the movable object's sensor system, or a predefined model, dots that are located inside the target object and outside the target object may be identified. This allows for more precise, while still safe, navigation around the target object.

For example, by default, the space around a target object may be filled with dots that are arranged in a cubic lattice, where each dot it one meter away from its nearest neighbors. To improve navigability of the target object, the dots may not be homogeneously distributed. Instead, the density of dots in the space closest to the target object may be increased, while the density of dots in spaces farther from the target object may be decreased in density. A weighted movement function may then be applied to the dots; the weighted movement function can be based at least on the characteristics of the movable object. For example, one movable object may most efficiently travel in a single plane, increasing the favorability of dots that are coplanar with the movable object, while a second movable object may most efficiently travel diagonally. Different weight functions may be applied accordingly to the dots in the space around the target object. Similarly, if a movable object can stop within approximately half a meter, then any dots within half a meter of the target object should be removed or weighted such that they cannot be selected, so as to reduce the likelihood of impact with the target object. Pathfinding algorithms may then be used to dynamically generate paths within the space based on the weight value for each dot. The weights and/or density of the dots can be determined (e.g., pre-generated or dynamically) based on the characteristics of the movable object, the mission, and/or the environment. Accordingly, a pathfinding algorithm may identify different paths dynamically, as conditions and/or the mission change.

Figure 10:
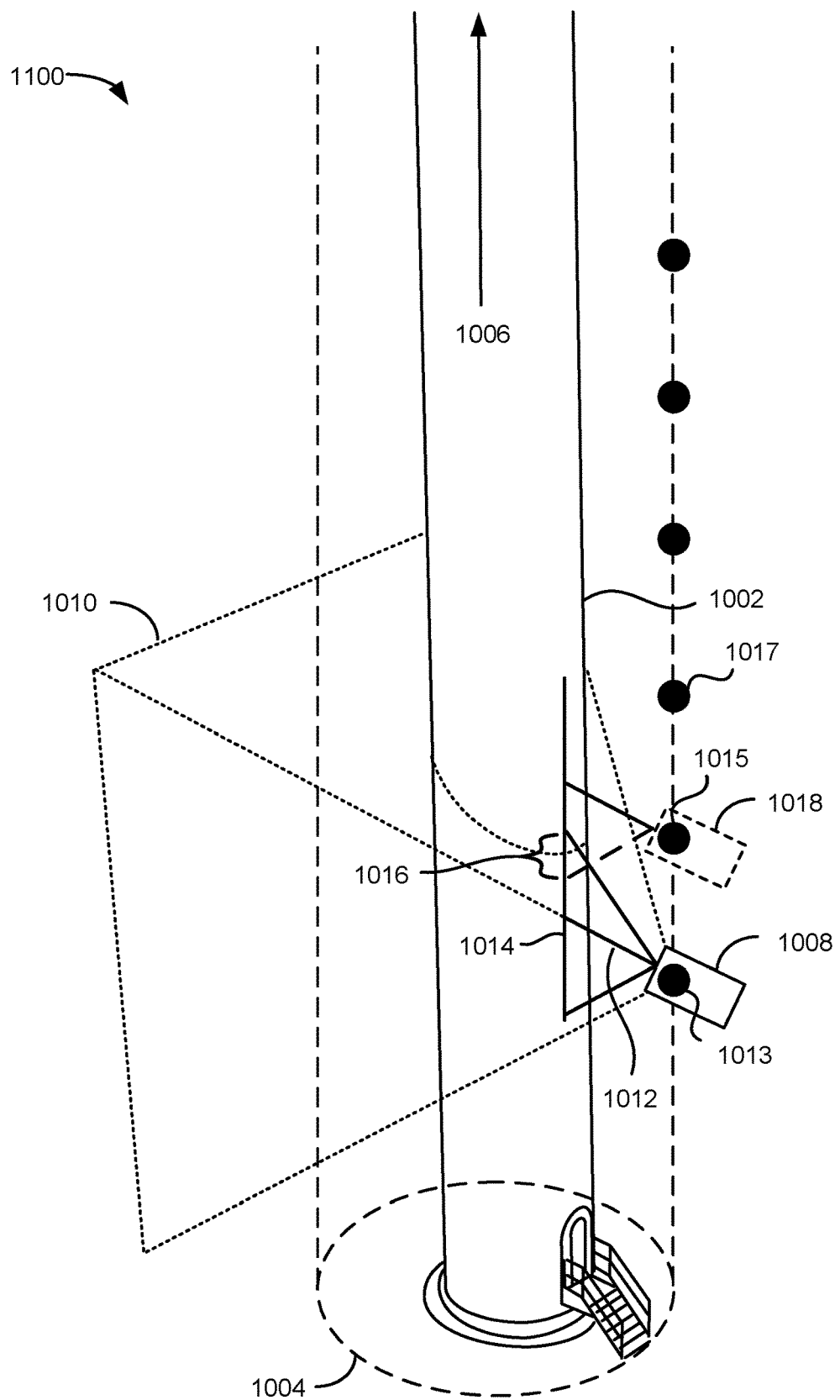
FIGS. 10-12 illustrate examples of an unmanned aircraft capturing images of a wind turbine under inspection, in accordance with various embodiments.
Figure 11:
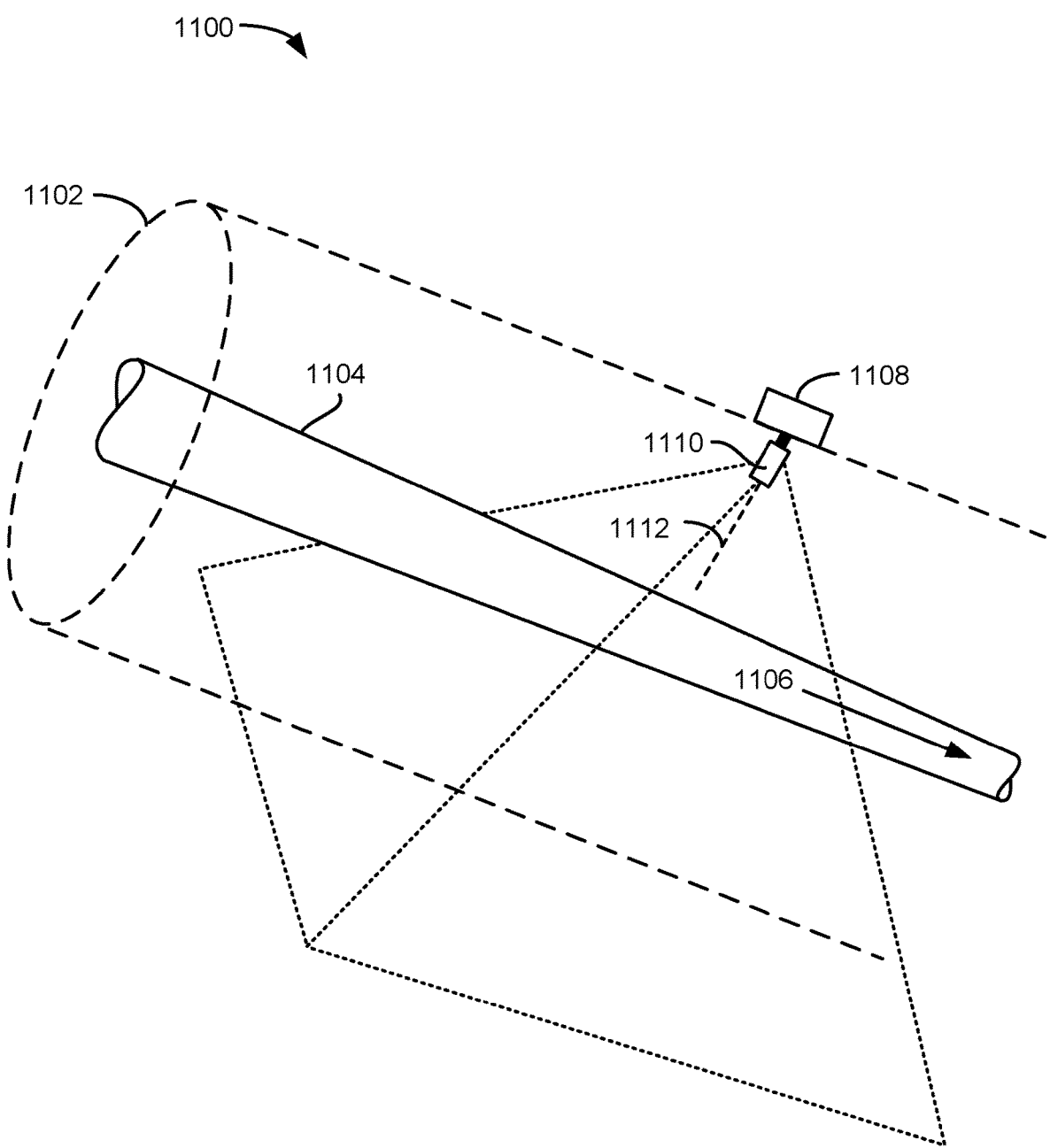
Figure 12:
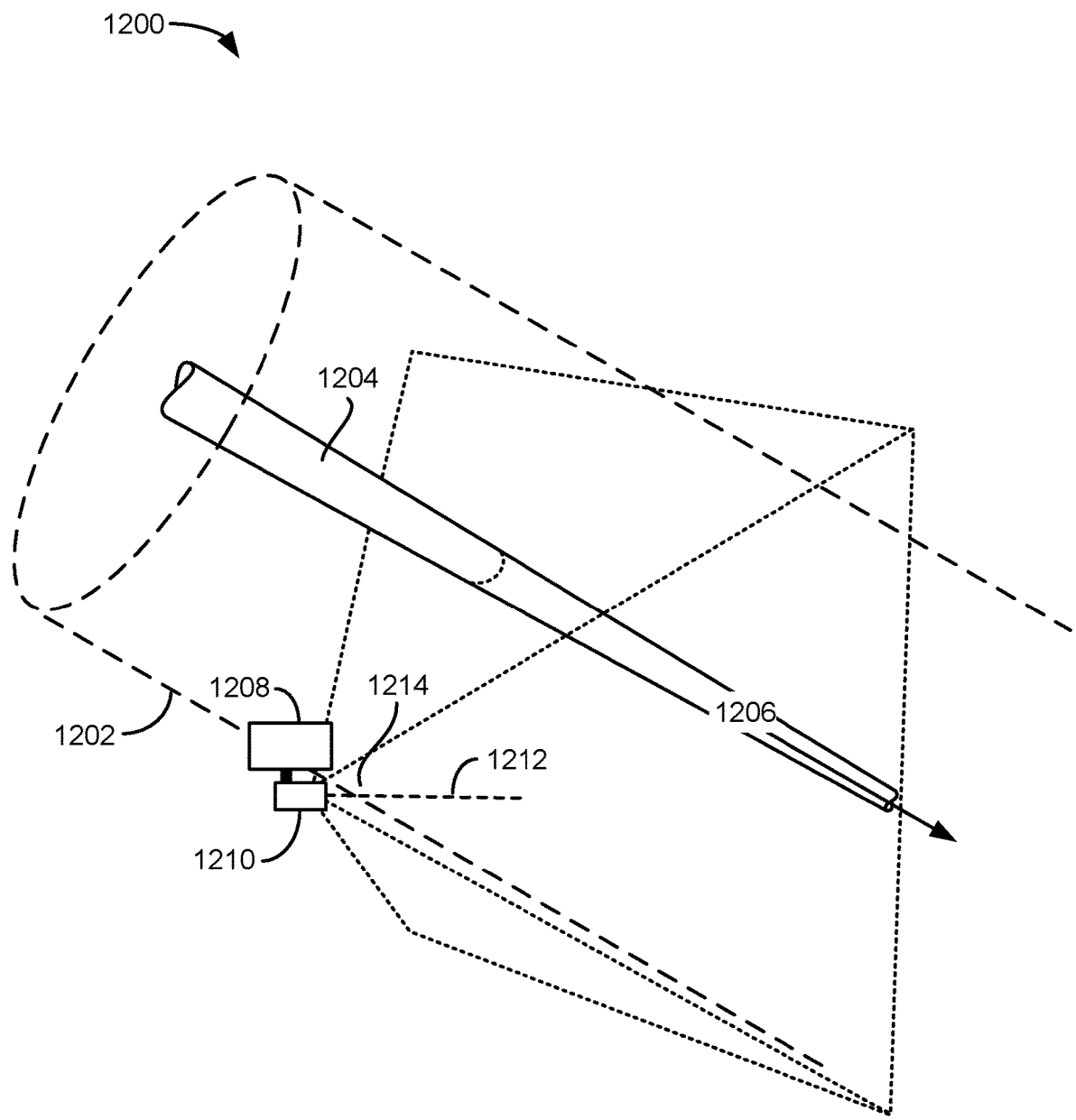

FIGS. 10-12 illustrate examples of an unmanned aircraft capturing images of a wind turbine under inspection, in accordance with various embodiments. FIG. 10 shows a simulated view 1000 of an inspection mission in progress. As shown in FIG. 10, the mast of a wind turbine 1002 can be the target object of a particular inspection mission, or portion of an inspection mission. As discussed, an inspection mission may include one or more cylindrical missions defined for each component of a target object. Cylindrical mission 1004 may be centered on the location data for the wind turbine (e.g., based on GPS coordinates received through the inspection app, measured or modeled on site, etc.). Each cylinder may be defined in a Cartesian space surrounding the target object and associated with a vector 1006. The vector may be used to define the direction of travel and the orientation of the movable object 1008 during the mission. When a mission begins, the movable object may perform image calibration. For example, the movable object may rise to the safety distance above the ground and focus its camera on the ground. This way, the camera will be focused for the correct distance, through most of the mission (e.g., some portions of the target object may be closer to or farther from the movable object, but may generally average at the safe distance). In some embodiments, the camera may also perform image calibration for exposure and other camera settings. In some embodiments, such image calibration may be performed before each image is captured, or at regular intervals (e.g., every X images, every X meters traveled, etc.).

The movable object may then execute the mission by generally traveling along the surface of the cylinder defined by the mission. As discussed above, the cylinder may be defined as an array of dots, each at a particular position such that the images captured by the movable object overlap according to the received mission attributes. The movable object may then move from dot to dot until the mission is complete. For example, each dot may represent a location at or near which the movable object may pause or hover to capture an image of the target object. Based on the characteristics of the image capture device, and the overlap parameter, the next dot may be positioned such that the next image overlaps with the current image by approximately the specified amount. For example, the field of view of the image capture device (illustrated by the pyramid 1010) and the distance from the target object 1012 (actual or approximate) are both known. Based on these values, the portion 1014 of the target object captured by the image capture device can be calculated. For example, if field of view of the image capture device is θ degrees, and the distance from the target object 1012 is D meters, the height (H) of the portion 1014 may be expressed as $$\frac{H}{2} = D \times \tan\frac{\theta}{2}.$$

If the movable object travels from its locations at dot 1013 vertically a distance equal to H 1014, there would be no overlap between images. Instead, the next dot 1015 may be located at a position 1018 less than H 1014 above the current position of the movable object 1008, such that the corresponding overlap 1016 is equal to, or approximately equal to, the overlap parameter. Movable object may then move vertically again to a location associated with dot 1017 and so on, until the movable object has captured images at each location in its vertical path. Similarly, lateral, or multidimensional movements may also be calculated such that the overlap is maintained at approximately the specified amount. In some embodiments, the number of pictures captured at each dot may vary depending on the features of the image capture device in use. For example, depending on the zoom and field of view capabilities of a given camera, the movable object may be able to capture multiple images before moving to a new location by moving the carrier to adjust the positioning of the image capture device. By reducing the number of times the movable object must relocate, the mission time can be reduced. In some embodiments, rather than requiring the movable object to stop and stabilize for each image to be captured, continuous footage of the target object may be captured. For example, a video of the target object may be captured and reviewed. In some embodiments, the video may be separated into frames and overlapping frames may be extracted for review.

Once the mission is complete, the movable object may relocate to another portion of the target object to perform the next inspection mission. FIG. 11 shows a simulated view 1100 of a different portion of the inspection mission. As shown in FIG. 11, a cylindrical mission 1102 can be defined for a blade 1104 of the wind turbine. The cylinder can be rotated in the Cartesian space until it overlaps appropriately with the blade. As in FIG. 11, the cylinder 1102 may be associated with a vector 1106 from which the direction of travel and orientation of the camera may be defined. FIG. 12 shows a simulated view 1200 of different portion of the inspection mission. As shown in FIG. 12, a cylindrical mission 1202 can be defined for a blade 1204 of the wind turbine. The cylinder can be rotated in the Cartesian space until it overlaps appropriately with the blade. In some embodiments, missions 1102 and 1202 may be the same mission. As depicted, in FIG. 11, when the movable object 1108 is above the target object 1104, the rotation of the carrier 1110 may enable the optical axis 1112 of the image capture device attached to the carrier to be aligned with the target object. This may simplify the movement of the movable object to capture the images of the blade as the range of motion of the carrier is relatively large for directions underneath the movable object. However, in FIG. 12, the movable object 1208 is depicted as being below the target object 1204. With the target object located above the movable object, the movement of the carrier 1210 is restricted. For example, as shown in FIG. 12, the potential range of motion 1212 of the carrier is limited to those ranges that do not interfere with the movable object itself (e.g., such that the movable object is in view of the image capture device, or such that the movable object physically obstructs the motion of the carrier 1210). As such, in some embodiments, the carrier 1210 may be locked such that the optical axis 1214 of the image capture device is parallel to the direction of travel of the movable object, keeping the target object 1204 in view as the movable object travels along the mission path. Images may then be captured at the appropriate interval, based on the requested overlap value. The center points of cylinders 1202 and 1102 may be measured on site or can be calculated based on known offsets. For example, the distance between the center of the mast and the center of rotation of the blades may be known or may be calculated from other known positions on the turbine. This center may then be used to define the mission cylinder.

Although each mission is discussed as being defined by a cylinder, not all target objects may be best captured by such a geometry. For example, the blades of a wind turbine being inspected may be stopped for inspection. The blades may be rotated to minimize wind resistance and flex; however, the blades may still deform under their own weight. This may lead to a several meters offset from end-to-end of the blade. As such, other conic sections may be used to define a mission that safely navigates the target object and captures images at approximately the same distance from the target object. In some embodiments, additional sensing, such as LiDAR, may be used to keep the movable object at the safe distance from the target object, even as the shape and location of the target object move.

As shown in FIGS. 10-12, a movable object may be required to reposition itself about the target object to complete an inspection mission. For example, once the mast has been inspected, the movable object may need to reposition itself to inspect a first blade. To transition between components safely, the movable object may return to the safe dots discussed above. The safe dots may define a safe path to avoid obstacles such as other portions of the target object or any other objects in the environment. The movable object can identify the closest safe dot to its current position and move to that dot. A safe path to the start point of the next component mission may then be determined, and the movable object may be dispatched along that path.

Figure 13:
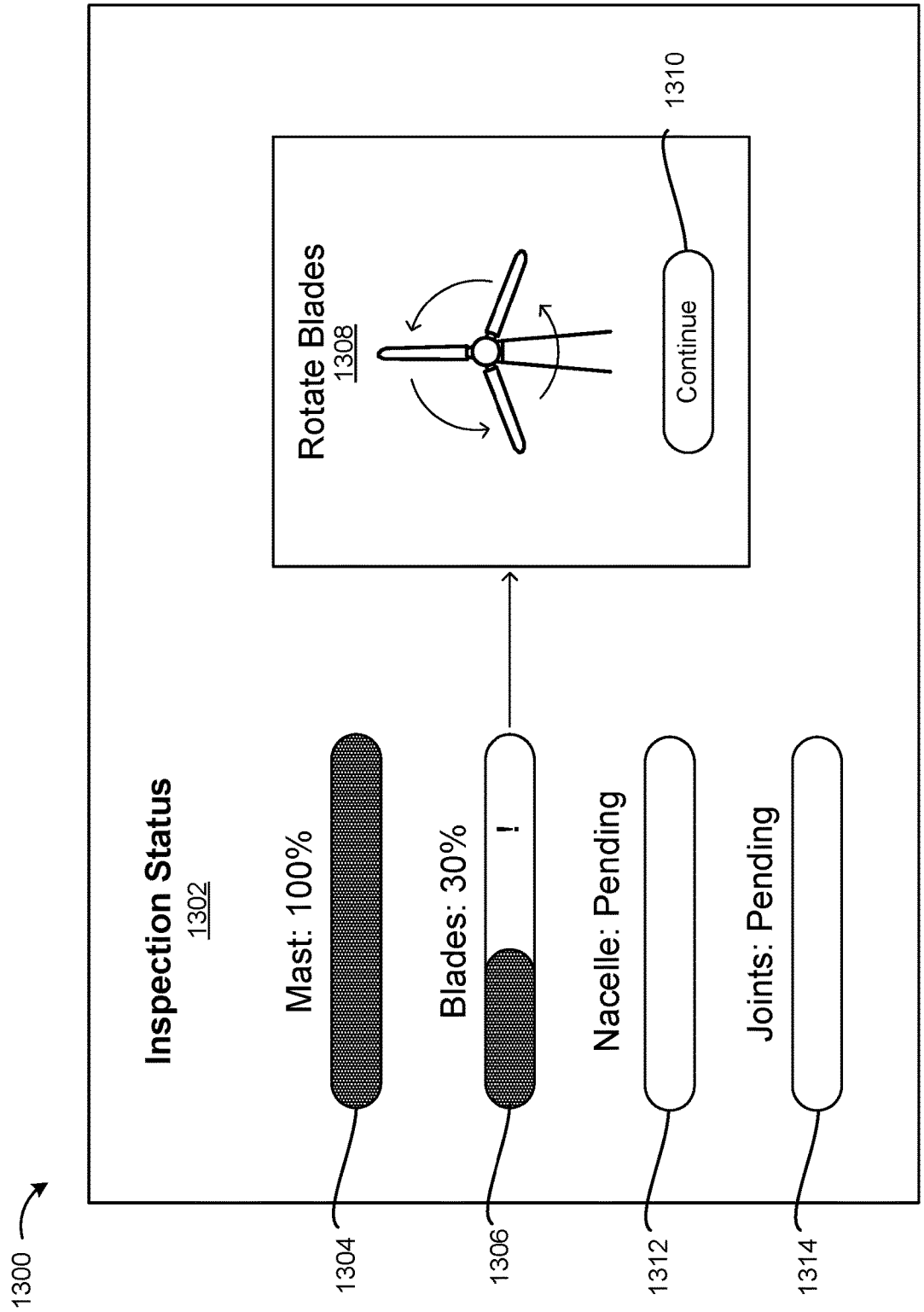
FIG. 13 illustrates an example inspection status user interface, in accordance with various embodiments.

FIG. 13 illustrates an example inspection status user interface, in accordance with various embodiments. As shown in FIG. 13, an inspection status user interface 1300 may track the current inspection mission and alert a user to any errors or interruptions in the inspection. In various embodiments, the inspection status user interface 1300 may include an inspection status 1302 for multiple components of the target object. For example, inspection status 1302 includes an inspection status for the mast 1304, which is indicated as being 100% complete. In various embodiments, an inspection completion can be determined based on the number of positions through which the movable object has traversed compared to the total number of positions defined for a given mission. Inspection status 1302 also includes a status for the blades 1306, which indicates that the inspection is 30% complete. An error message 1308 is associated with this status, indicating that the blades need to be rotated to complete the inspection (e.g., the blades may be angled too far off center to complete the inspection. Once the blades have been rotated, the error message can be cleared by selecting continue 1310, enabling the inspection mission to be resumed. In some embodiments, when an inspection error is encountered in one component, a path to the next component may be generated and the inspection may continue automatically. For example, when the blades error is detected, a new path may be generated to the nacelle, and the nacelle inspection 1312 or joints inspection 1314 may proceed. This allows for the inspection mission to continue for some components, while errors or obstructions associated with other components are cleared.

Figure 14:
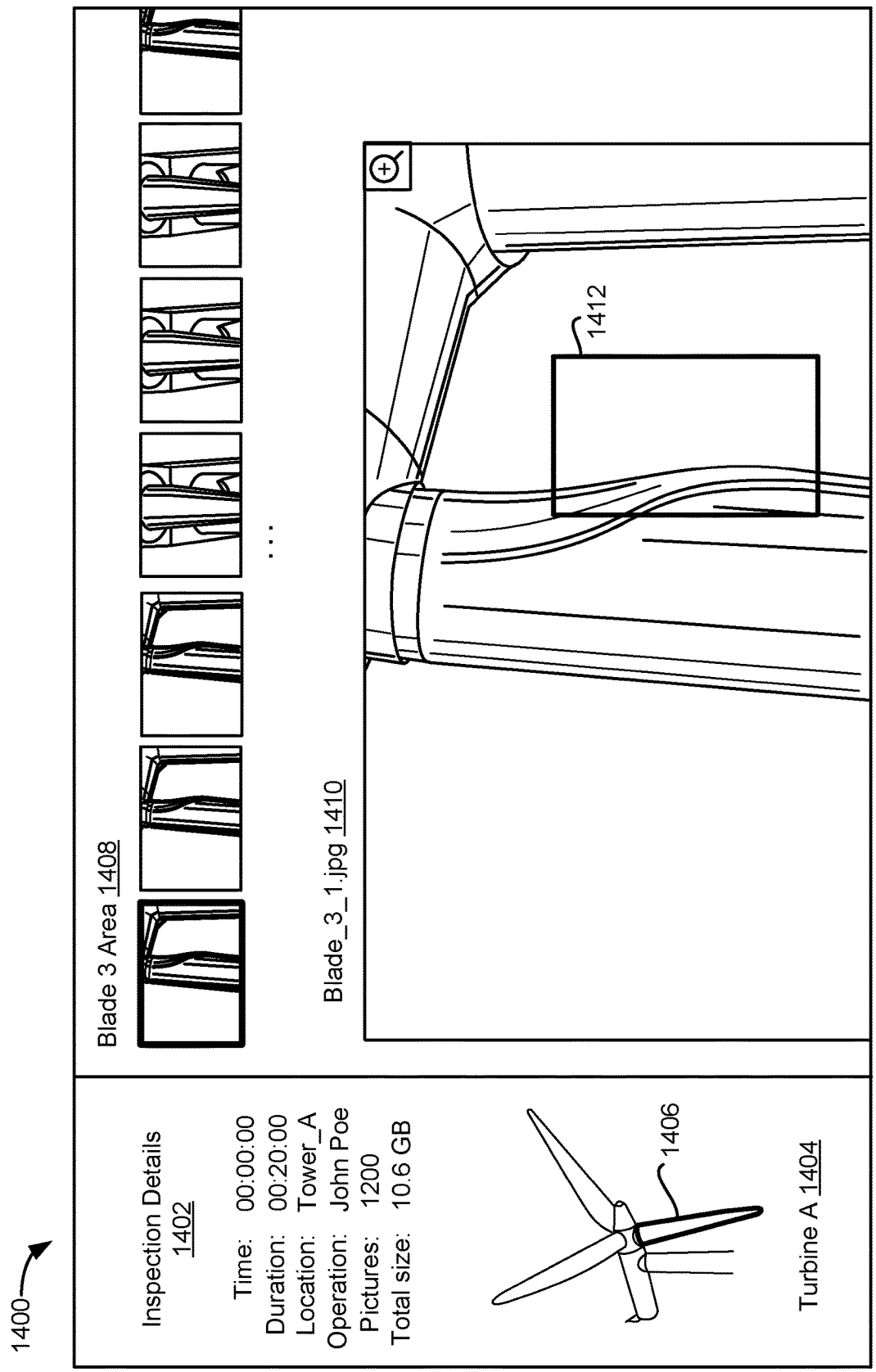
FIG. 14 illustrates an example of a user interface of a viewing application, in accordance with various embodiments.

FIG. 14 illustrates an example of a user interface of a viewing application, in accordance with various embodiments. As shown in FIG. 14, the user interface of a viewing application 1400 may include a description of the object that was inspected 1402, including inspection time, number of pictures, location, etc. In some embodiments, a diagram of the target object 1404 may be shown with the component currently being viewed highlighted 1406. The diagram may be selectable, such that a viewer can jump to images of a particular component by selecting that portion of the diagram. As shown, a gallery of images 1408 associated with the selected component may be displayed. Each image in the gallery of images 1408 may be selectable, such that the selected image is displayed larger 1410 for further inspection. In some embodiments, the viewing application may enable the reviewer to zoom in and out of the images, flag images for further inspection 1410, forward images to other users for further inspection, or other image processing tasks. In some embodiments, if an image is not reviewable (e.g., corrupted, blurry, overexposed, etc.) or if the reviewer would like a second look at the portion of the target object represented in the image, the reviewer may request a new mission be executed to recapture the selected image. As discussed, each image may be associated with inspection data indicating, e.g., the location and portion of the target object captured. The request may cause a movable object to be automatically dispatched to capture one or more images associated with the request. In some embodiments, all or some of the functionality of viewing application 1400 may be provided as modules of an inspection application, as discussed above.

Figure 15:
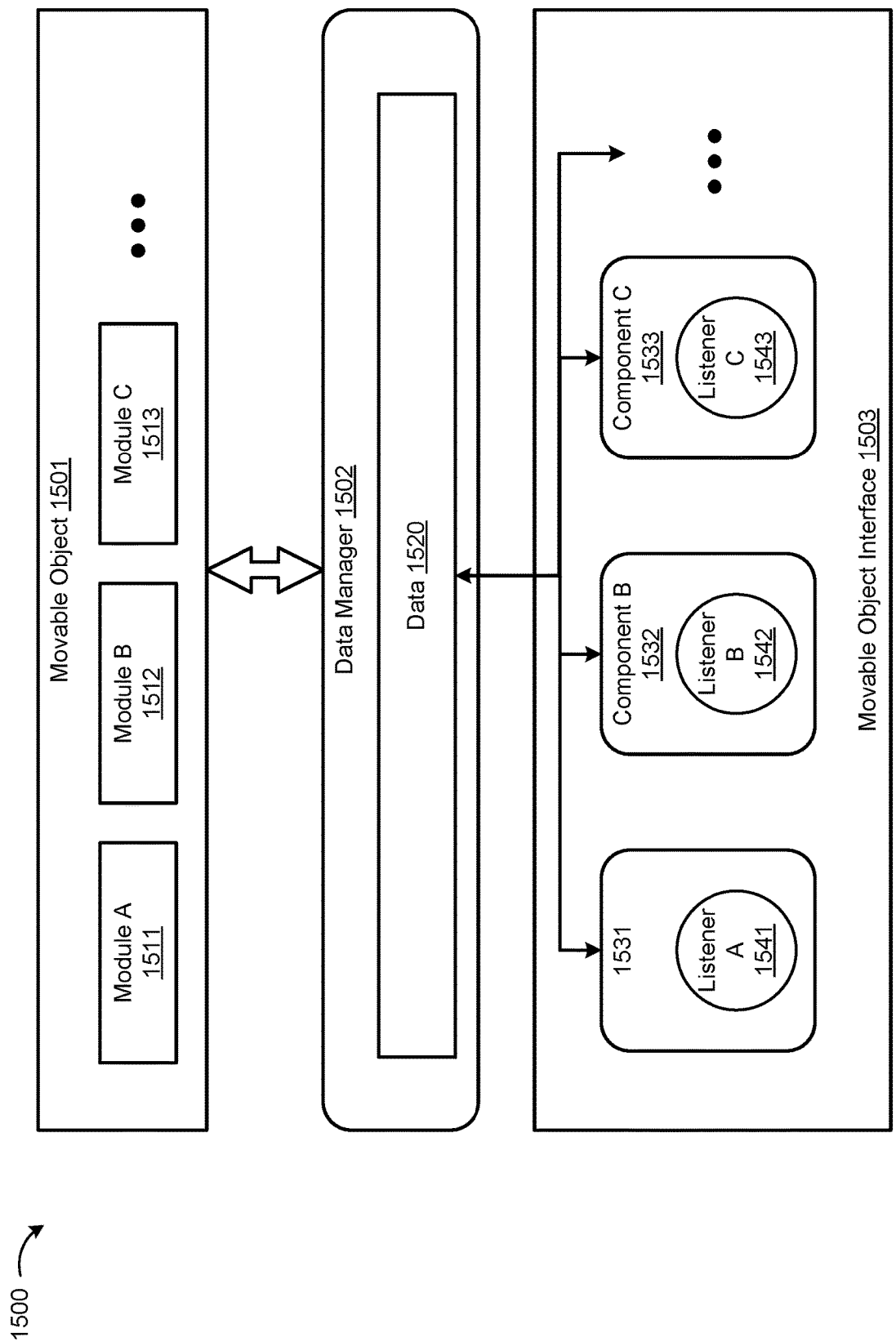
FIG. 15 illustrates an example of supporting a movable object interface in a software development environment, in accordance with various embodiments.

FIG. 15 illustrates an example of supporting a movable object interface in a software development environment, in accordance with various embodiments. As shown in FIG. 15, a movable object interface 1503 can be used for providing access to a movable object 1501 in a software development environment 1500, such as a software development kit (SDK) environment. As discussed above, the location manager can be provided as part of an SDK or mobile SDK to enable applications to use navigation and image capture services provided by the access manager and to communicate with movable objects.

Furthermore, the movable object 1501 can include various functional modules A-C 1511-1513, and the movable object interface 1503 can include different interfacing components A-C 1531-1533. Each said interfacing component A-C 1531-1533 in the movable object interface 1503 can represent a module A-C 1511-1513 in the movable object 1501.

In accordance with various embodiments, the movable object interface 1503 can provide one or more callback functions for supporting a distributed computing model between the application and movable object 1501.

The callback functions can be used by an application for confirming whether the movable object 1501 has received the commands. Also, the callback functions can be used by an application for receiving the execution results. Thus, the application and the movable object 1501 can interact even though they are separated in space and in logic.

As shown in FIG. 15, the interfacing components A-C 1531-1533 can be associated with the listeners A-C 1541-1543. A listener A-C 1541-1543 can inform an interfacing component A-C 1531-1533 to use a corresponding callback function to receive information from the related module(s).

Additionally, a data manager 1502, which prepares data 1520 for the movable object interface 1503, can decouple and package the related functionalities of the movable object 1501. Also, the data manager 1503 can be used for managing the data exchange between the applications and the movable object 1501. Thus, the application developer does not need to be involved in the complex data exchanging process.

For example, an SDK can provide a series of callback functions for communicating instance messages and for receiving the execution results from an unmanned aircraft. The SDK can configure the life cycle for the callback functions in order to make sure that the information interchange is stable and completed. For example, the SDK can establish connection between an unmanned aircraft and an application on a smart phone (e.g. using an Android system or an iOS system). Following the life cycle of a smart phone system, the callback functions, such as the ones receiving information from the unmanned aircraft, can take advantage of the patterns in the smart phone system and update the statements accordingly to the different stages in the life cycle of the smart phone system.

Figure 16:
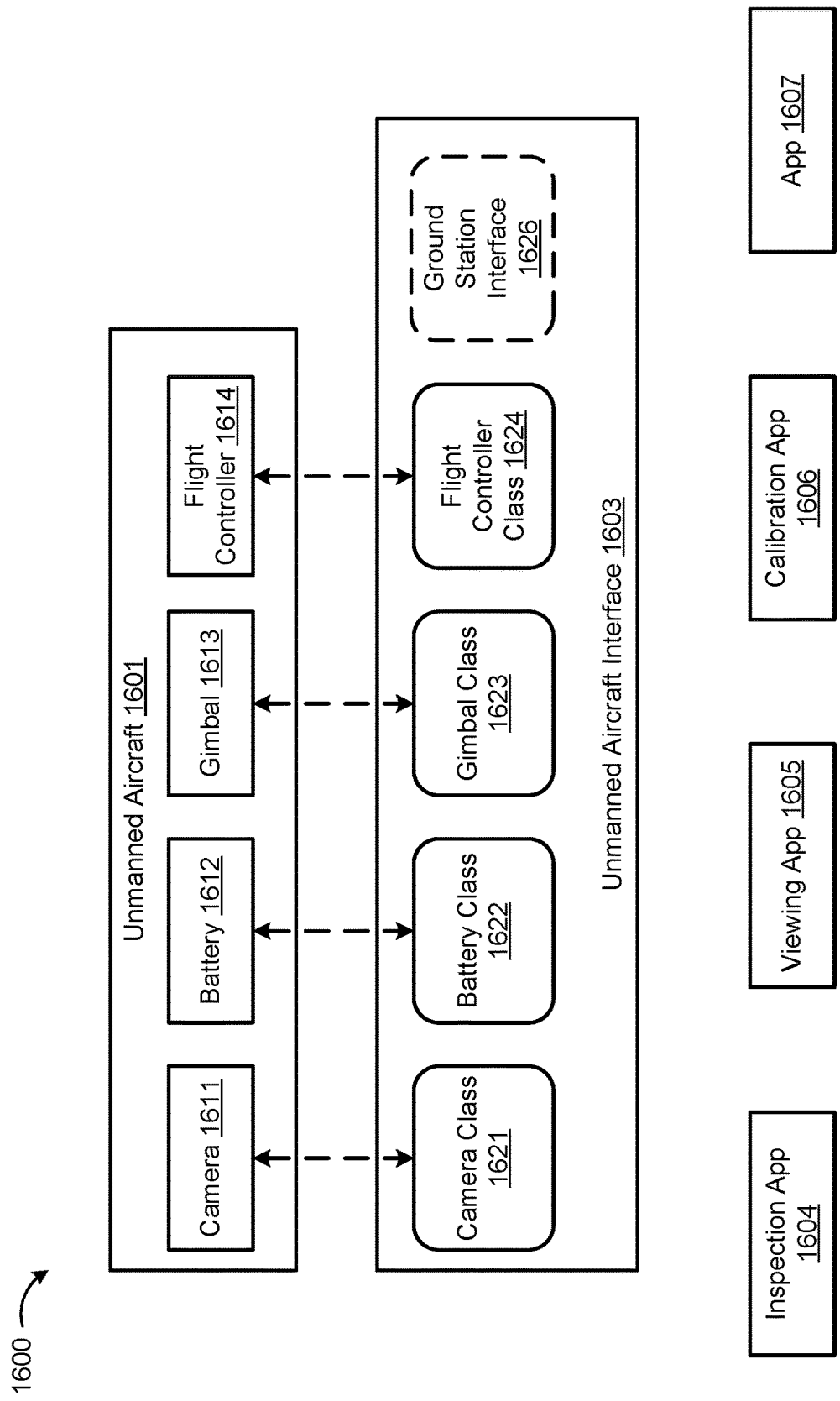
FIG. 16 illustrates an example of an unmanned aircraft interface, in accordance with various embodiments.

FIG. 16 illustrates an example of an unmanned aircraft interface, in accordance with various embodiments. As shown in FIG. 16, an unmanned aircraft interface 1603 can represent an unmanned aircraft 1601. Thus, the applications, e.g. APPs 1604-1607, in the unmanned aircraft environment 1600 can access and control the unmanned aircraft 1601. As discussed, these apps may include an inspection app 1604, a viewing app 1605, and a calibration app 1606.

For example, the unmanned aircraft 1601 can include various modules, such as a camera 1611, a battery 1612, a gimbal 1613, and a flight controller 1614.

Correspondingly, the movable object interface 1603 can include a camera component 1621, a battery component 1622, a gimbal component 1623, and a flight controller component 1624.

Additionally, the movable object interface 1603 can include a ground station component 1626, which is associated with the flight controller component 1624. The ground station component operates to perform one or more flight control operations, which may require a high-level privilege.

Figure 17:
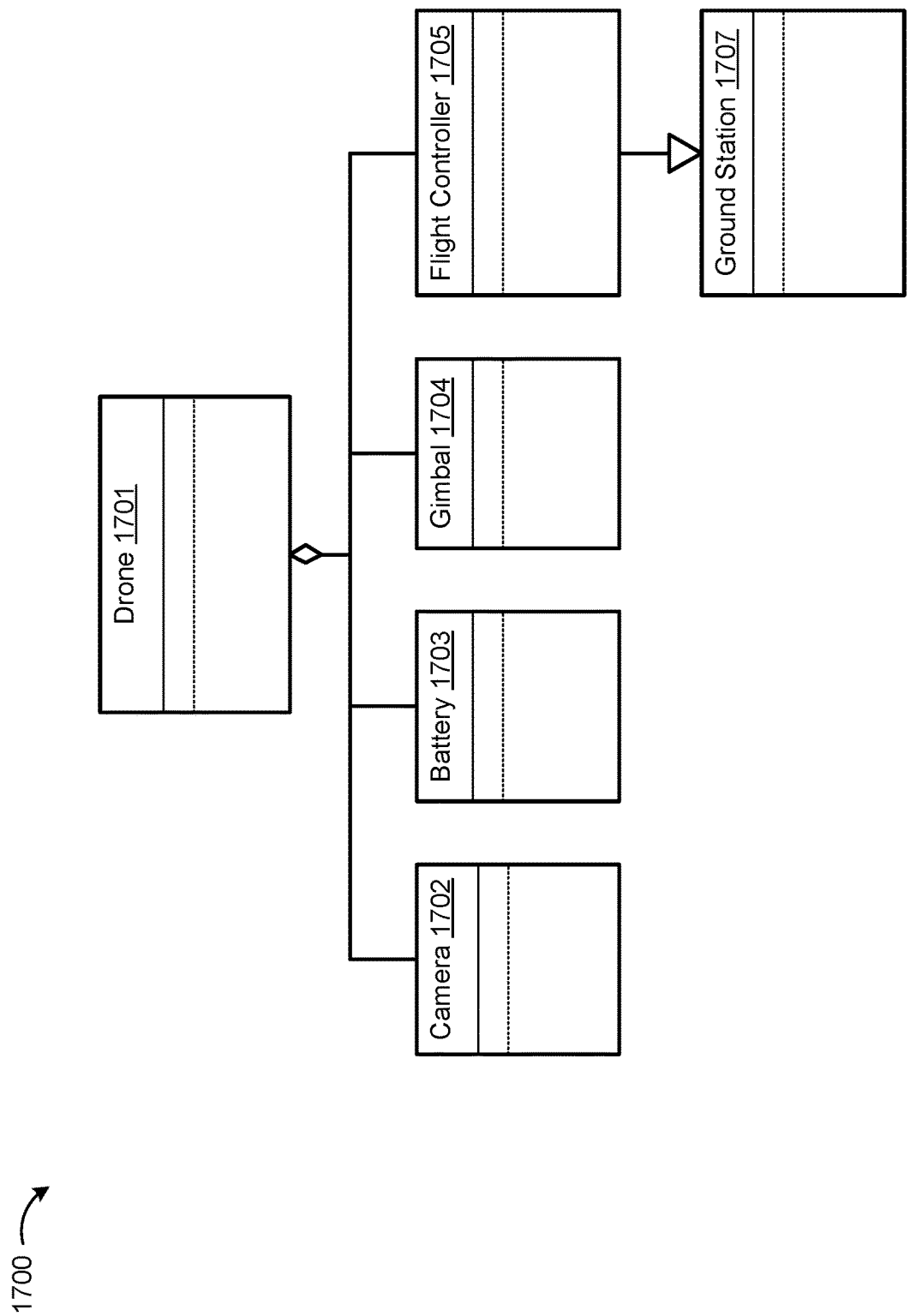
FIG. 17 illustrates an example of components for an unmanned aircraft in a software development kit (SDK), in accordance with various embodiments.

FIG. 17 illustrates an example of components for an unmanned aircraft in a software development kit (SDK), in accordance with various embodiments. As shown in FIG. 17, the drone class 1701 in the SDK 1700 is an aggregation of other components 1702-1707 for an unmanned aircraft (or a drone). The drone class 1701, which have access to the other components 1702-1707, can exchange information with the other components 1702-1707 and controls the other components 1702-1707.

In accordance with various embodiments, an application may be accessible to only one instance of the drone class 1701. Alternatively, multiple instances of the drone class 1701 can present in an application.

In the SDK, an application can connect to the instance of the drone class 1701 in order to upload the controlling commands to the unmanned aircraft. For example, the SDK may include a function for establishing the connection to the unmanned aircraft. Also, the SDK can disconnect the connection to the unmanned aircraft using an end connection function. After connecting to the unmanned aircraft, the developer can have access to the other classes (e.g. the camera class 1702 and the gimbal class 1704). Then, the drone class 1701 can be used for invoking the specific functions, e.g. providing access data which can be used by the flight controller to control the behavior, and/or limit the movement, of the unmanned aircraft.

In accordance with various embodiments, an application can use a battery class 1703 for controlling the power source of an unmanned aircraft. Also, the application can use the battery class 1703 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1703 can be configured such that if the battery level is low, the unmanned aircraft can terminate the tasks and go home outright.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1702 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1702 for modifying the setting of photos and records. For example, the SDK may include a function that enables the developer to adjust the size of photos taken. Also, an application can use a media class for maintaining the photos and records.

In accordance with various embodiments, an application can use a gimbal class 1704 for controlling the view of the unmanned aircraft. For example, the Gimbal Class can be used for configuring an actual view, e.g. setting a first personal view of the unmanned aircraft. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1705 for providing various flight control information and status about the unmanned aircraft. As discussed, the flight controller class can include functions for receiving and/or requesting access data to be used to control the movement of the unmanned aircraft across various regions in an unmanned aircraft environment.

Using the Main Controller Class, an application can monitor the flight status, e.g. using instant messages. For example, the callback function in the Main Controller Class can send back the instant message every one thousand milliseconds (1000 ms).

Furthermore, the Main Controller Class allows a user of the application to investigate the instance message received from the unmanned aircraft. For example, the pilots can analyze the data for each flight in order to further improve their flying skills.

In accordance with various embodiments, an application can use a ground station class 1707 to perform a series of operations for controlling the unmanned aircraft.

For example, the SDK may require applications to have a SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the unmanned aircraft.

Figure 18:
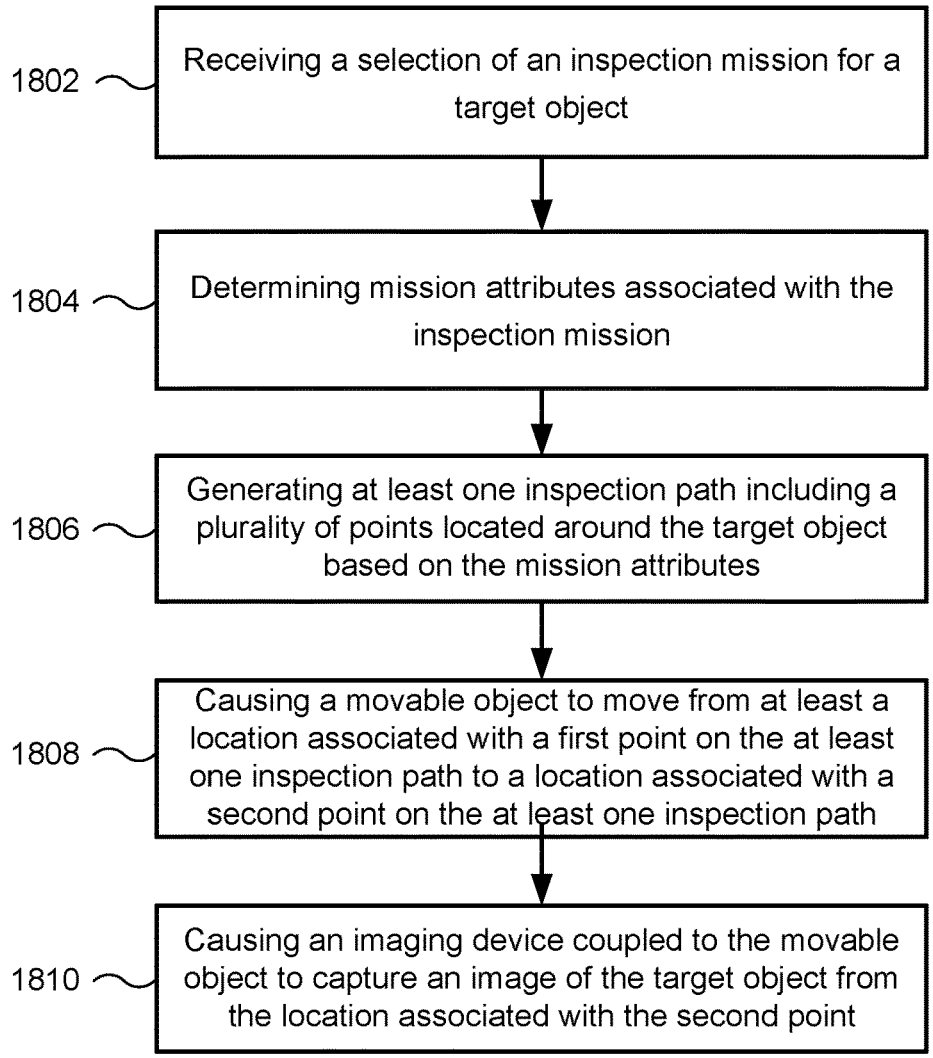
FIG. 18 shows a flowchart of object inspection in a movable object environment, in accordance with various embodiments.

FIG. 18 shows a flowchart of object inspection in a movable object environment, in accordance with various embodiments. At step 1802, a selection of an inspection mission for a target object can be received. For example, a plurality of missions may be defined for different target objects or types of target objects. The user may select the target object my tapping, clicking, or otherwise interacting with a representation of the mission on a computing device in communication with the movable object. In some embodiments, each mission may be associated with location data. When the inspection application is opened, a location associated with the inspection may be determined (e.g., using a GPS system or other location module of the client device). If the current location matches a mission location, that mission may be selected automatically.

At step 1804, mission attributes associated with the inspection mission may be determined. As discussed, mission attributes may include inspection attributes, such as dimension and location information associated with a target object, and image capture attributes, such as overlap, safe distance, etc. The movable object attributes may include determining a type of movable object in use. For example, different movable objects may have different flight characteristics and may therefore be associated with different path weights used to determine inspection paths for the mission. Additionally, different movable objects may be associated with different image capture devices having different characteristics, such as zoom or field of view. In some embodiments, determining mission attributes associated with the inspection mission may include causing the movable object to determine one or more attributes of the target object using one or more sensors carried by the movable object. These attributes may include a width, a radius, a length, a profile, or a location of at least a portion of the target object. The attributes may be determined by causing the movable object to move around the target object while collecting sensing data from the one or more sensors. In some embodiments, the one or more sensors include a laser rangefinder and a global positioning system sensor.

In some embodiments, the sensors may be used to inspect all or a portion of the target object as the movable object travels along the inspection path. For example, the rangefinder sensor may be used to determine a first boundary and a second boundary of a first portion of the target object, along with corresponding distances to each boundary. This may be used to calculate a width of the first portion of the target object based at least on the first distance and the second distance. In some embodiments, the movable object can be positioned substantially orthogonal the first portion of the target object and a GPS location of the movable object can be determined. Using the width of the first portion and a measured distance from the movable object to the first portion of the target object, an approximate center point of the first portion of the target object may be calculated.

At step 1806, at least one inspection path including a plurality of points located around the target object may be generated based on the mission attributes. In some embodiments, the plurality of points may include a first set of points around a starting point near the target object. Additional positions may then be calculated dynamically based on the mission attributes and movable object attributes during the inspection. For example, based on the field of view of the image capture device, several positions near a starting point may be determined. The next set of positions may then be determined based on the overlap required for the inspection. In some embodiments, pathfinding algorithms may be used to identify paths along which to perform the inspection. In some embodiments, such pathfinding algorithms may similarly be employed to identify safe paths to or from the target object or to transition between different portions of the target object.

At step 1808, a movable object may be caused to move from at least a location associated with a first point on the at least one inspection path to a location associated with a second point on the at least one inspection path. During the inspection, the movable object may be similarly caused to move to subsequent locations associated with subsequent points on the inspection path. In some embodiments, the at least on inspection path may be updated based at least on environmental conditions or movable object attributes. Such updating may include updating a location associated with at least one of the plurality of points.

At step 1810, an imaging device coupled to the movable object can be caused to capture an image of the target object from the location associated with the second point. As the inspection continues, the imaging device coupled to the movable object can be caused to capture subsequent images of the target object from locations associated with subsequent points on the inspection path.

In some embodiments, the movable object may determine that a plurality of images of the target object have been captured at locations associated with the plurality of points of the at least one inspection path. The plurality of images may be associated with at least a first portion of the target object. Subsequently, a user may request to view the plurality of images using a viewing application. The user may select at least the first portion of the target object, and each image from the plurality of images of the target object may be displayed on a computing device.

Many features of the various embodiments can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, Microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanisms utilizing the results. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, embodiments may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

Embodiments have been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A method for performing inspection of a target object in a movable object environment, comprising:
   receiving a selection of an inspection mission for a target object;
   determining, by a movable object, mission attributes associated with the inspection mission, the mission attributes including dimensions of one or more portions of the target object to be inspected;
   determining, by the movable object, a plurality of locations around the target object based on the mission attributes;
   generating, by the movable object during the inspection mission, at least one first inspection path including a first plurality of points located around the target object based on the mission attributes, the first plurality of points corresponding to a subset of the plurality of locations;
   causing the movable object to move from at least a location associated with a first point on the at least one first inspection path to a location associated with a second point on the at least one first inspection path;
   causing an imaging device coupled to the movable object to capture an image of the target object from the location associated with the second point; and
   dynamically generating at least one second inspection path including a second plurality of points, the second plurality of points determined during the inspection mission based on the mission attributes and a change in location of the movable object.

2. The method of claim 1, further comprising:
   causing the movable object to move from the location associated with the second point to at least a location associated with a third point on the first inspection path; and
   causing an imaging device coupled to the movable object to capture a second image of the target object from the location associated with the third point.

3. The method of claim 2, wherein the location associated with the third point on the first inspection path is determined based on the mission attributes.

4. The method of claim 3, wherein the mission attributes are received through a user interface provided by a computing device in communication with the movable object.

5. The method of claim 1, further comprising:
   updating the at least one first inspection path based at least on environmental conditions or movable object attributes, wherein updating the at least one first inspection path includes updating a location associated with at least one of the plurality of points.

6. The method of claim 2, further comprising:
   determining a plurality of images of the target object have been captured at locations associated with the plurality of points of the at least one first inspection path; and
   associating the plurality of images with at least a first portion of the target object.

7. The method of claim 6, further comprising:
   receiving a request to view at least the first portion of the target object;
   causing each image from the plurality of images of the target object to be displayed in an inspection application on a computing device.

8. The method of claim 1, wherein determining mission attributes associated with the inspection mission further comprises:
   causing the movable object to determine one or more attributes of the target object using one or more sensors carried by the movable object.

9. The method of claim 8, wherein the one or more attributes of the target object include a width, a radius, a length, a profile, or a location of at least a portion of the target object.

10. The method of claim 9, wherein causing the movable object to determine the one or more attributes of the target object further comprises:
    causing the movable object to move around the target object while collecting sensing data from the one or more sensors.

11. The method of claim 10 wherein the one or more sensors include a laser rangefinder and a global positioning system sensor.

12. The method of claim 8, wherein causing the movable object to determine one or more attributes of the target object using one or more sensors carried by the movable object further comprises:
    determining a first boundary of a first portion of the target object using a rangefinder;
    determining a first distance to the first boundary using the rangefinder;
    determining a second boundary of the first portion of the target object;
    determining a second distance to the second boundary; and
    calculating a width of the first portion of the target object based at least on the first distance and the second distance.

13. The method of claim 12, further comprising:
    causing the movable object to move to a position substantially orthogonal the first portion of the target object;
    determining a GPS location of the movable object;
    determining a third distance to the first portion of the target object using rangefinder distance; and
    calculating a location of the target object by combining the third distance and half of the width of the first portion.

14. A system for performing inspection of a target object in a movable object environment, comprising:
    a movable object;
    an imaging device coupled to the movable object;
    one or more processors; and
    a memory that stores one or more computer-executable instructions which, when executed by the one or more processors, cause the one or more processors to:
      receive a selection of an inspection mission for a target object;
      determine mission attributes associated with the inspection mission, the mission attributes including dimensions of one or more portions of the target object to be inspected;
      determine a plurality of locations around the target object based on the mission attributes;
      generate at least one first inspection path including a first plurality of points located around the target object based on the mission attributes, the plurality of points corresponding to a subset of the plurality of locations;

cause the movable object to move from at least a location associated with a first point on the at least one first inspection path to a location associated with a second point on the at least one first inspection path;

cause the imaging device coupled to the movable object to capture an image of the target object from the location associated with the second point; and dynamically generate at least one second inspection path including a second plurality of points, the second plurality of points determined during the inspection mission based on the mission attributes and a change in location of the movable object.

15. The system of claim 14, wherein the computer-executable instructions further cause the one or more processors to:

cause the movable object to move from the location associated with the second point to at least a location associated with a third point on the first inspection path; and cause an imaging device coupled to the movable object to capture a second image of the target object from the location associated with the third point.

16. The system of claim 15, wherein the location associated with the third point on the first inspection path is determined based on the mission attributes.

17. The system of claim 16, wherein the mission attributes are received through a user interface provided by a computing device in communication with the movable object.

18. The system of claim 15, wherein the computer-executable instructions further cause the one or more processors to:

determine a plurality of images of the target object have been captured at locations associated with the first plurality of points of the at least one first inspection path; and associate the plurality of images with at least a first portion of the target object.

19. The system of claim 14, further comprising:
one or more sensors carried by the movable object;
wherein to determine mission attributes associated with the inspection mission, the computer-executable instructions further cause the one or more processors to:
cause the movable object to determine one or more attributes of the target object using one or more sensors carried by the movable object.

20. The system of claim 19, wherein the one or more attributes of the target object include a width, a radius, a length, a profile, or a location of at least a portion of the target object.

21. The system of claim 20, wherein to cause the movable object to determine the one or more attributes of the target object, the computer-executable instructions further cause the one or more processors to:

cause the movable object to move around the target object while collecting sensing data from the one or more sensors.

22. The system of claim 19, wherein to cause the movable object to determine one or more attributes of the target object using one or more sensors carried by the movable object, the computer-executable instructions further cause the one or more processors to:

determine a first boundary of a first portion of the target object using a rangefinder;

determine a first distance to the first boundary using the rangefinder;

determine a second boundary of the first portion of the target object;

determine a second distance to the second boundary; and calculate a width of the first portion of the target object based at least on the first distance and the second distance.

23. The system of claim 22, wherein the computer-executable instructions further cause the one or more processors to:

move to a position substantially orthogonal the first portion of the target object;

determine a GPS location of the movable object;

determine a third distance to the first portion of the target object using rangefinder distance; and calculate a location of the target object by combining the third distance and half of the width of the first portion.

24. A non-transitory computer readable storage medium including instructions stored thereon which, when executed by a processor, cause the processor to:

receive a selection of an inspection mission for a target object;

determine, by a movable object, mission attributes associated with the inspection mission, the mission attributes including dimensions of one or more portions of the target object to be inspected;

determine, by the movable object, a plurality of locations around the target object based on the mission attributes;

generate, by the movable object during the inspection mission, at least one first inspection path including a first plurality of points located around the target object based on the mission attributes, the first plurality of points corresponding to a subset of the plurality of locations;

cause the movable object to move from at least a location associated with a first point on the at least one first inspection path to a location associated with a second point on the at least one first inspection path;

cause an imaging device coupled to the movable object to capture an image of the target object from the location associated with the second point; and dynamically generate at least one second inspection path including a second plurality of points, the second plurality of points determined during the inspection mission based on the mission attributes and a change in location of the movable object.

25. The non-transitory computer readable storage medium of claim 24, wherein the instructions, when executed by a processor, further cause the processor to:

cause the movable object to move from the location associated with the second point to at least a location associated with a third point on the first inspection path; and causing an imaging device coupled to the movable object to capture a second image of the target object from the location associated with the third point, wherein the location associated with the third point on the first inspection path is determined based on an overlap parameter and a safety parameter received through a computing device in communication with the movable object.

26. An unmanned aerial vehicle (UAV) comprising:
an imaging device;
one or more sensors;

one or more processors; and a memory that stores one or more computer-executable instructions which, when executed by the one or more processors, cause the UAV to:

determine one or more attributes of a target object, the one or more attributes including dimensions of one or more portions of the target object to be inspected;

determine a plurality of locations around the target object based on the attributes;

generate a first inspection path around the target object based on the one or more attributes of the target object during an inspection mission, the first inspection path corresponding to a subset of the plurality of locations;

move along the first inspection path;

capture one or more images of the target object from the first inspection path using the imaging device; and dynamically generate a second inspection path corresponding to a second subset of the plurality of locations during the inspection mission based on the mission attributes and a change in location of the movable object.

27. The UAV of claim 26, wherein to determine one or more attributes of a target object, the computer-executable instructions, when executed, further cause the UAV to:

determine one or more attributes of the target object using the one or more sensors.

28. The UAV of claim 27, wherein the one or more attributes of the target object include a width, a radius, a length, a profile, or a location of at least a portion of the target object.

29. The UAV of claim 28, wherein to determine the one or more attributes of the target object, the computer-executable instructions, when executed, further cause the UAV to:

move around the target object while collecting sensing data from the one or more sensors.

30. The UAV of claim 26, wherein to capture one or more images of the target object from the first inspection path, the computer-executable instructions, when executed, further cause the UAV to:

move from a first location associated with a first point on the first inspection path to a second location associated with a second point on the first inspection path; and capture video of the target object while moving from the first location to the second location.

31. The method of claim 1, wherein the plurality of locations around the target object are further determined based on a safety distance.

* * * * *